(12) United States Patent
Konzelmann et al.

(10) Patent No.: US 12,020,703 B2
(45) Date of Patent: Jun. 25, 2024

(54) ENABLING NATURAL CONVERSATIONS WITH SOFT ENDPOINTING FOR AN AUTOMATED ASSISTANT

(71) Applicant: GOOGLE LLC, Mountain View, CA (US)

(72) Inventors: Jaclyn Konzelmann, Mountain View, CA (US); Trevor Strohman, Sunnyvale, CA (US); Jonathan Bloom, Maplewood, NJ (US); Johan Schalkwyk, Scarsdale, NY (US); Joseph Smarr, Half Moon Bay, CA (US)

(73) Assignee: GOOGLE LLC, Mountain View, CA (US)

( * ) Notice: Subject to any disclaimer, the term of this patent is extended or adjusted under 35 U.S.C. 154(b) by 189 days.

(21) Appl. No.: 17/532,819

(22) Filed: Nov. 22, 2021

(65) Prior Publication Data
US 2023/0053341 A1   Feb. 23, 2023

Related U.S. Application Data

(60) Provisional application No. 63/233,877, filed on Aug. 17, 2021.

(51) Int. Cl.
*G10L 15/22* (2006.01)
*G06N 20/00* (2019.01)
(Continued)

(52) U.S. Cl.
CPC .............. *G10L 15/22* (2013.01); *G06N 20/00* (2019.01); *G08B 5/36* (2013.01); *G10L 15/18* (2013.01);
(Continued)

(58) Field of Classification Search
None
See application file for complete search history.

(56) References Cited

U.S. PATENT DOCUMENTS

| | | | | |
|---|---|---|---|---|
| 10,832,005 | B1 * | 11/2020 | Mohajer | G10L 25/87 |
| 2014/0282003 | A1 * | 9/2014 | Gruber | G06F 3/165 |
| | | | | 715/727 |

(Continued)

OTHER PUBLICATIONS

European Patent Office; International Search Report and Written Opinion issued in Application No. PCT/US2021/060987; 22 pages; dated Jul. 4, 2022.

(Continued)

*Primary Examiner* — Stella L. Woo
(74) *Attorney, Agent, or Firm* — Gray Ice Higdon

(57) ABSTRACT

As part of a dialog session between a user and an automated assistant, implementations can process, using a streaming ASR model, a stream of audio data that captures a portion of a spoken utterance to generate ASR output, process, using an NLU model, the ASR output to generate NLU output, and cause, based on the NLU output, a stream of fulfillment data to be generated. Further, implementations can further determine, based on processing the stream of audio data, audio-based characteristics associated with the portion of the spoken utterance captured in the stream of audio data. Based on the audio-based characteristics and/the stream of NLU output, implementations can determine whether the user has paused in providing the spoken utterance or has completed providing of the spoken utterance. If the user has paused, implementations can cause natural conversation output to be provided for presentation to the user.

18 Claims, 10 Drawing Sheets

(51) Int. Cl.
    *G08B 5/36*         (2006.01)
    *G10L 15/08*       (2006.01)
    *G10L 15/18*       (2013.01)

(52) U.S. Cl.
    CPC .. *G10L 2015/088* (2013.01); *G10L 2015/223* (2013.01)

(56) References Cited

U.S. PATENT DOCUMENTS

| | | | |
|---|---|---|---|
| 2018/0260680 A1 | 9/2018 | Finkelstein et al. | |
| 2019/0034554 A1* | 1/2019 | Knudson | G06F 16/90332 |
| 2020/0335128 A1* | 10/2020 | Sheeder | G10L 15/04 |
| 2020/0365146 A1 | 11/2020 | Adiba et al. | |
| 2022/0093101 A1* | 3/2022 | Krishnan | G10L 15/063 |
| 2022/0115001 A1* | 4/2022 | Bratt | G10L 15/22 |

OTHER PUBLICATIONS

European Patent Office; Invitation to pay additional fees issued in Application No. PCT/US2021/060987; 15 pages; dated May 11, 2022.

Anu J.P. et al.; Sentence Segmentation for Speech Processing; 2014 IEEE National Conference on Communication, Signal Processing and Networking; 4 pages; dated Apr. 10, 2014.

* cited by examiner

ENABLING NATURAL CONVERSATIONS WITH SOFT ENDPOINTING FOR AN AUTOMATED ASSISTANT

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). Automated assistants typically rely upon a pipeline of components in interpreting and responding to spoken utterances (or touch/typed input). For example, an automatic speech recognition (ASR) engine can process audio data that correspond to a spoken utterance of a user to generate ASR output, such as speech hypotheses (i.e., sequence of term(s) and/or other token(s)) of the spoken utterance or phoneme(s) that are predicted to correspond to the spoken utterance. Further, a natural language understanding (NLU) engine can process the ASR output (or the touch/typed input) to generate NLU output, such as an intent of the user in providing the spoken utterance (or the touch/typed input) and optionally slot value(s) for parameter(s) associated with the intent. Moreover, a fulfillment engine can be used to process the NLU output, and to generate fulfillment output, such as a structured request to obtain responsive content to the spoken utterance and/or perform an action responsive to the spoken utterance, and a stream of fulfillment data can be generated based on the fulfillment output.

Generally, a dialog session with an automated assistant is initiated by a user providing a spoken utterance, and the automated assistant can respond to the spoken utterance using the aforementioned pipeline of components to generate a response. The user can continue the dialog session by providing an additional spoken utterance, and the automated assistant can respond to the additional spoken utterance using the aforementioned pipeline of components to generate an additional response. Put another way, these dialog sessions are generally turn-based in that the user takes a turn in the dialog session to provide a spoken utterance, and the automated assistant takes a turn in the dialog session to respond to the spoken utterance when the user stops speaking. However, these turn-based dialog sessions, from a perspective of the user, may not be natural since they do not reflect how humans actually converse with one another.

For example, a first human may provide multiple disparate spoken utterances to convey a single thought to a second human, and the second human can consider each of the multiple disparate spoken utterances in formulating a response to the first human. In some instances, the first human may pause for varying amounts of time between these multiple disparate utterances (or for varying amounts of time in providing a single spoken utterance). Notably, the second human may not be able to fully formulate the response to the first human simply based on a first spoken utterance (or a portion thereof), of the multiple disparate spoken utterances, or each of the multiple disparate spoken utterances in isolation.

Similarly, in these turn-based dialog sessions, the automated assistant may not be able to fully formulate a response to a given spoken utterance of a user (or a portion thereof) without considering a context of the given spoken utterance with respect to multiple disparate spoken utterances or without waiting for the user to complete providing of the given spoken utterance. As a result, these turn-based dialog sessions can be prolonged as the user attempts to convey his/her thoughts to the automated assistant in a single spoken utterance during a single turn of these turn-based dialog sessions, thereby wasting computational resources. Further, if the user attempts to convey his/her thoughts to the automated assistant in multiple spoken utterances during a single turn of these turn-based dialog sessions, the automated assistant may simply fail, thereby also wasting computational resources. For example, the automated assistant may, when the user provides a long pause in attempting to formulate a spoken utterance, prematurely conclude the user is done speaking, process the incomplete spoken utterance, and fail as a result of determining (from the processing) that no meaningful intent is conveyed by the incomplete spoken utterance or fail as a result of determining (from the processing) an incorrect intent that is conveyed by the incomplete spoken utterance. Additionally, turn-based dialog sessions can prevent a spoken utterance of a user, provided during rendering of an assistant response, from being meaningfully processed. This can require the user to await completion of rendering of the assistant response before providing the spoken utterance, thereby prolonging the dialog session.

SUMMARY

Implementations described herein are directed to enabling an automated assistant to perform natural conversations with a user during a dialog session. Some implementations can process, using a streaming automatic speech recognition (ASR) model, a stream of audio data generated by microphone(s) of a client device of the user to generate a stream of ASR output. The stream of audio data can capture a portion of a spoken utterance of the user that is directed to an automated assistant implemented at least in part at the client device. Further, the ASR output can be processed, using a natural language understanding (NLU) model, to generate a stream of NLU output. Moreover, the NLU output can be processed, using one or more fulfillment rules and/or one or more fulfillment models, to generate a stream of fulfillment data. Additionally, audio-based characteristics associated with one or more of the spoken utterances can be determined based on processing the stream of audio data. The audio-based characteristics associated with the portion of the spoken utterance include, for example, intonation, tone, stress, rhythm, tempo, pitch, elongated syllables, pause, grammar(s) associated with pause, and/or other audio-based characteristics that may be derived from processing the stream of audio data. Based on the stream of NLU output and/or the audio-based characteristics, the automated assistant can determine whether the user has paused in providing of the spoken utterance or has completed providing of the spoken utterance (e.g., soft endpointing).

In some implementations, in response to determining that the user has paused in providing of the spoken utterance, the automated assistant can cause natural conversation output to be provided for presentation to the user to indicate the automated assistant is waiting for the user complete providing of the spoken utterance (and even if the automated assistant determines that fulfillment of the spoken utterance can be performed in various implementations). In some implementations, in response to determining that the user has completed providing of the spoken utterance, the automated assistant can cause fulfillment output to be provided for presentation to the user. Accordingly, by determining whether the user paused in providing of the spoken utterance or completed providing of the spoken utterance, the automated assistant can naturally wait for the user to complete his/her thoughts based on what the user said and how they said it, rather than simply responding to the user after the user pauses in providing of the spoken utterance as in turn-based dialog sessions.

For example, assume that a user is engaged in a dialog session with an automated assistant and provides a spoken utterance of "call Arnolllld's". As the user provides the spoken utterance, the stream of ASR output, the stream of NLU output, and the stream of fulfillment data can be generated based on processing the stream of audio data that captures the spoken utterance. Notably, in this example and at an instance of time the spoken utterance is received, the stream of ASR output may include recognized text corresponding to the spoken utterance (e.g., "call Arnold's"), the stream of NLU output may include a predicted "call" or "phone call" intent having a slot value of "Arnold" for a callee parameter associated with the predicted "call or "phone call" intent, and, the stream of fulfillment data can include an assistant command that, when executed as the fulfillment output, causes the client device or an additional client device in communication with the client device to initiate a phone call with a contact entry of the user associated with the entity reference "Arnold". Moreover, audio-based characteristics associated with the spoken utterance can be generated based on processing the stream of audio data, and can include, for example, elongated syllables (e.g., as indicated by the "llll" in "call Arnolllld's") that indicates the user is unsure what exactly is intended for the callee parameter. Accordingly, in this example, even though the automated assistant may be able to fulfill the spoken utterance based on the stream of NLU data (e.g., by causing the client device or the additional client device to initiate a phone call with a contact entry "Arnold"), the automated assistant may determine that the user has paused and refrain from causing the spoken utterance to be fulfilled to provide additional time for the user to complete the spoken utterance based on the audio-based characteristics.

Rather, in this example, the automated assistant can determine to provide natural conversation output for presentation to the user. For instance, in response to determining that the has paused in providing of the spoken utterance (and optionally after the user has paused for a threshold duration of time), the automated assistant can cause natural conversation output, such as "Mmhmm" or "Uh huhh" (or other speech back channels), to be provided for audible presentation to the user via speaker(s) of the client device to indicate that the automated assistant is waiting for the user to complete providing of the spoken utterance. In some instances, a volume of the natural conversation output that is provided for audible presentation to the user can be lower than other audible output provided for presentation to the user. Additionally, or alternatively, in implementations where the client device includes a display, the client device can render one or more graphical elements, such as a streaming transcription of the spoken utterance along with bouncing ellipses, to indicate that the automated assistant is waiting for the user to complete providing of the spoken utterance. Additionally, or alternatively, in implementations where the client device includes one or more light emitting diodes (LEDs), the client device can cause one or more of the LEDs to be illuminated to indicate that the automated assistant is waiting for the user to complete providing of the spoken utterance. Notably, while the natural conversation output is being provided for audible presentation to the user of the client device, one or more automated assistant components (e.g., ASR, NLU, fulfillment, and/or other components) can remain active to continue processing the stream of audio data.

In this example, further assume that the user provides a spoken utterance of "Arnold's Trattoria" to complete providing of the prior spoken utterance while the natural conversation output is being provided for audible presentation or after the natural conversation output is provided for audible presentation, resulting in a spoken utterance of "call Arnold's Trattoria", where "Arnold's Trattoria" is a fictitious Italian restaurant. Accordingly, the stream of ASR output, the stream of NLU output, and the stream of fulfillment data can be updated based on the user completing the spoken utterance. In particular, the stream of NLU output may still include the predicted "call" or "phone call" intent, but having a slot value of "Arnold' Trattoria" for a callee parameter associated with the predicted "call or "phone call" intent (e.g., rather than the contact entry "Arnold"), and, the stream of fulfillment data can include an assistant command that, when executed as the fulfillment output, causes the client device or an additional client device in communication with the client device to initiate a phone call with a restaurant associated with the entity reference "Arnold's Trattoria". Further, the automated assistant can cause the client device or the additional client device in communication with the client device to initiate the phone call in response to determining that the spoken utterance is complete.

In contrast, further assume that the user did not provide any spoken utterance to complete providing of the prior spoken utterance after the natural conversation output is provided for audible presentation (and optionally for a threshold duration of time after the natural conversation output is provided for audible presentation). In this example, the automated assistant can determine additional natural conversation output to be provided for audible presentation to the user. However, the additional natural conversation can explicitly request that the user of the client device complete the spoken utterance (e.g., "You were saying?", "Did I miss something?", etc.) or explicitly request that the user of the client device provide particular slot value(s) for the predicted intent(s) (e.g., "Who did you want to call?", etc.). In some implementations, and assuming that the user then provides a spoken utterance of "Arnold's Trattoria" to complete providing of the prior spoken utterance, the stream of ASR output, the stream of NLU output, and the stream of fulfillment output can be updated, and the automated assistant can cause the spoken utterance to be fulfilled as described above (e.g., by causing the client device to initiate the phone call with the restaurant associated with the entity reference "Arnold's Trattoria").

In additional or alternative implementations, and assuming that the client device includes a display, the automated assistant can provide a plurality of selectable graphical elements for visual presentation to the user, where each of the selectable graphical elements are associated with different interpretations of one or more portions of the spoken utterance. In this example, the automated assistant can provide a first selectable graphical element that, when selected, causes the automated assistant to initiate a phone call with the restaurant "Arnold's Trattoria" and a second selectable graphical element that, when selected, causes the automated assistant to initiate a phone call with the contact entry "Arnold". The automated assistant can then initiate the phone call based on receiving a user selection of a given one of the selectable graphical elements, or initiate the phone call based on NLU measures associated with the interpretations if the user does not select one of the selectable graphical elements within a threshold duration of time of causing the one or more selectable graphical elements to be presented. For instance, in this example, the automated assistant can initiate the phone call with the restaurant "Arnold's Trattoria" if the user does not provide a selection of one or more of the selectable graphical elements within five seconds, seven seconds, or any other threshold duration of time after the one or more selectable graphical elements are provided for presentation to the user.

As another example, assume that a user is engaged in a dialog session with an automated assistant and provides a spoken utterance of "what's on my calendar forrrr". As the user provides the spoken utterance, the stream of ASR output, the stream of NLU output, and the stream of fulfillment data can be generated based on processing the stream of audio data that captures the spoken utterance. Notably, in this example and at an instance of time the spoken utterance is received, the stream of ASR output may include recognized text corresponding to the spoken utterance (e.g., "what's on my calendar for"), the stream of NLU output may include a predicted "calendar" or "calendar lookup" intent having an unknown slot value for a date parameter associated with the predicted "calendar" or "calendar lookup" intent, and, the stream of fulfillment data can include an assistant command that, when executed as the fulfillment output, causes the client device to lookup the user's calendar information. Similarly, audio-based characteristics associated with the spoken utterance can be generated based on processing the stream of audio data, and can include, for example, elongated syllables (e.g., as indicated by the "rrrr" in "what's on my calendar forrrr") that indicates the user is unsure about the date parameter. Accordingly, in this example, the automated assistant may not be able to fulfill the spoken utterance based on the stream of NLU data (e.g., based on the unknown slot value) and/or the audio-based characteristics of the spoken utterance, the automated assistant may determine that the user has paused and refrain from causing the spoken utterance to be fulfilled to provide additional time for the user to complete the spoken utterance based on the audio-based characteristics.

Similarly, in this example, the automated assistant can determine to provide natural conversation output for presentation to the user. For instance, in response to determining that the has paused in providing of the spoken utterance (and optionally after the user has paused for a threshold duration of time), the automated assistant can cause natural conversation output, such as "Mmhmm" or "Uh huhh", to be provided for audible presentation to the user via speaker(s) of the client device to indicate that the automated assistant is waiting for the user to complete providing of the spoken utterance, and/or other indications that indicate the automated assistant is waiting for the user to complete providing of the spoken utterance. However, further assume that the user did not provide any to complete providing of the prior spoken utterance after the natural conversation output is provided for audible presentation (and optionally for a threshold duration of time after the natural conversation output is provided for audible presentation). In this example, the automated assistant may simply infer a slot value of a current date for the unknown date parameter associated with the predicted "calendar" or "calendar lookup" intent, and cause the automated assistant to fulfill the spoken utterance by providing the user with calendar information for the current date (e.g., audibly and/or visually) even though the user did not complete the spoken utterance. In additional or alternative implementations, the automated assistant can utilize one or more additional or alternative automated assistant components to disambiguate any spoken utterances, confirm fulfillment of any spoken utterances, and/or perform any other actions prior to causing any assistant command to be fulfilled In various implementations, such as the latter example where the user initially provided the spoken utterance of "what's on my calendar forrrr", and in contrast with the former example where the user initially provided the spoken utterance of "call Arnolllld's", the automated assistant can determine one or more computational costs associated with fulfilling the spoken utterance to be fulfilled and/or undoing fulfillment of the spoken utterance in the case that the spoken utterance was incorrectly fulfilled. For instance, in the former example, the computational costs associated with fulfilling the spoken utterance can include at least causing the phone call to be initiated with the contact entry "Arnold", and the computational costs associated with undoing fulfillment of the spoken utterance can include at least terminating the phone call with the contact entry associated with "Arnold", re-initiating the dialog session with the user, processing additional spoken utterances, and causing another phone call to be initiated with the restaurant "Arnold's Trattoria". Moreover, in the former example, one or more user costs associated with initiating a phone call that the user did not intend may be relatively high. Also, for instance, in the latter example, the computational costs associated with fulfilling the spoken utterance can include at least causing calendar information for the current date to be provided for presentation to the user, and the computational costs associated with undoing fulfillment of the spoken utterance can include causing calendar information for another date specified by the user to be provided for presentation to the user. Moreover, in the latter example, one or more user costs associated with providing incorrect calendar information to the user may be relatively low. Put another way, the computational costs associated with fulfillment (and undoing the fulfillment) in the former example are relatively higher than the computational costs associated with fulfillment (and undoing the fulfillment) in the latter example. Accordingly, the automated assistant may determine in the latter example to fulfill the spoken utterance with the inferred date parameter based on the latter computational costs in an attempt to conclude the dialog session in a more quick and efficient manner, but not in the former example due to the former computational costs.

By using the techniques described herein, one or more technical advantages can be achieved. As one non-limiting example, the techniques described herein enable the automated assistant to engage in natural conversations with a user during a dialog session. For instance, the automated assistant can determine whether the user paused in providing a spoken utterance or completed providing of the spoken utterance and adapt output provided for presentation to the user accordingly, such that the automated assistant is not limited to turn-based dialog sessions or dependent on determining that a user is done speaking before responding to the user. Accordingly, the automated assistant can determine when to respond to a user and how to respond to the user as the user engages in these natural conversations. This results in various technical advantages that conserve computational resources at a client device, and can cause dialog sessions to be concluded in a quicker and more efficient manner. For instance, a quantity of occurrences of the automated assistant failing can be reduced since the automated assistant can wait for more information from the user prior to attempting to perform any fulfillment on behalf of the user (even in instances where the automated assistant predicts fulfillment should be performed). Also, for instance, a quantity of user inputs received at the client device can be reduced since a quantity of occurrences of the user having to repeat themselves or re-invoke the automated assistant can be reduced.

As used herein, a "dialog session" may include a logically-self-contained exchange between a user and automated assistant (and in some cases, other human participants). The automated assistant may differentiate between multiple dialog sessions with the user based on various signals, such as passage of time between sessions, change of user context (e.g., location, before/during/after a scheduled meeting, etc.) between sessions, detection of one or more intervening interactions between the user and the client device other than dialog between the user and the automated assistant (e.g., the user switches applications for a while, the user walks away from then later returns to a standalone voice-activated product), locking/sleeping of the client device between sessions, change of client devices used to interface with the automated assistant, and so forth.

The above description is provided as an overview of only some implementations disclosed herein. Those implementations, and other implementations, are described in additional detail herein.

It should be understood that techniques disclosed herein can be implemented locally on a client device, remotely by server(s) connected to the client device via one or more networks, and/or both.

DETAILED DESCRIPTION

Figure 1:
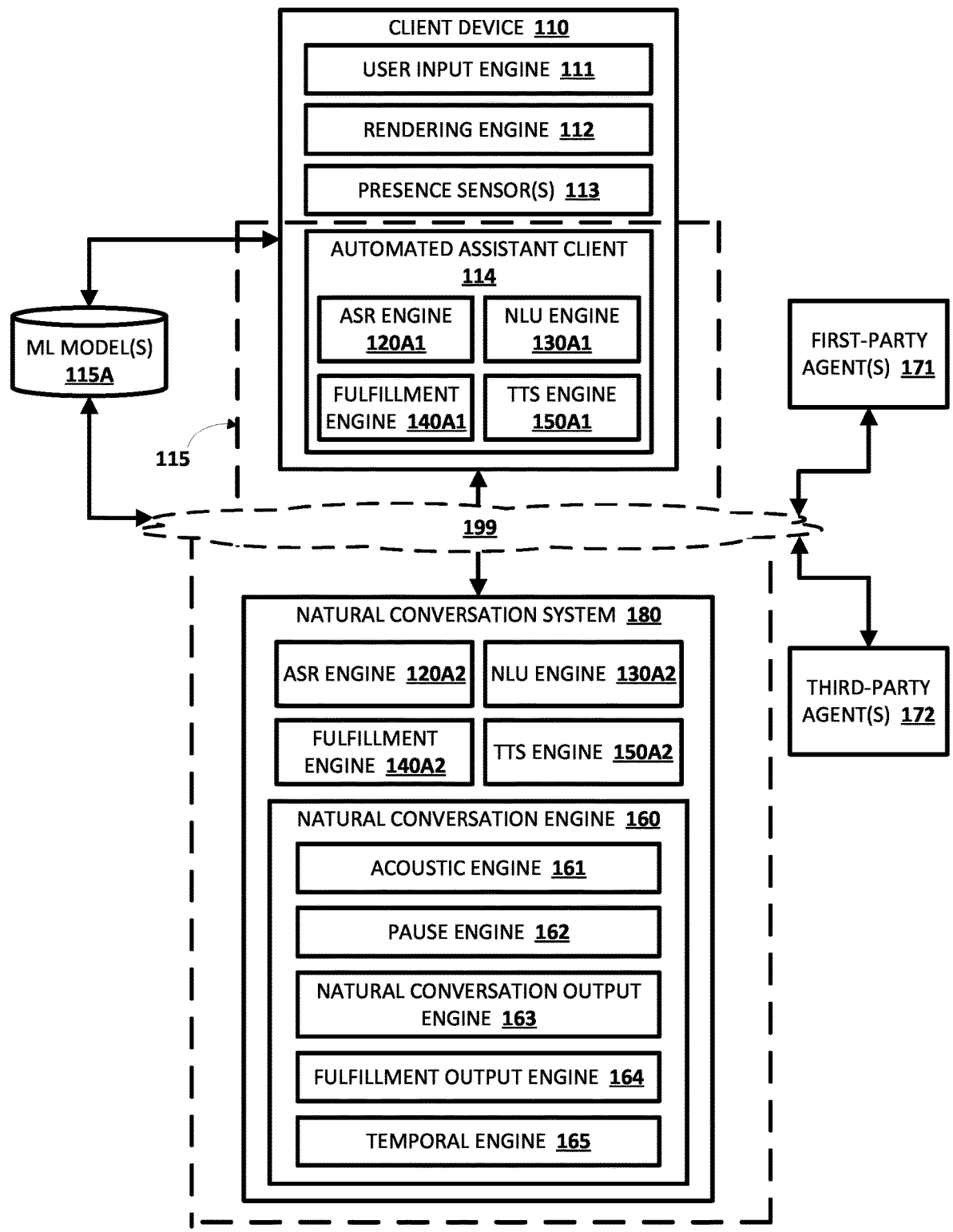
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. The example environment includes a client device 110 and a natural conversation system 180. In some implementations, the natural conversation system 180 can be implemented locally at the client device 110. In additional or alternative implementations, the natural conversation system 180 can be implemented remotely from the client device 110 as depicted in FIG. 1 (e.g., at remote server(s)). In these implementations, the client device 110 and the natural conversation system 180 may be communicatively coupled with each other via one or more networks 199, such as one or more wired or wireless local area networks ("LANs," including Wi-Fi LANs, mesh networks, Bluetooth, near-field communication, etc.) or wide area networks ("WANs", including the Internet).

The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute an automated assistant client 114. An instance of the automated assistant client 114 can be an application that is separate from an operating system of the client device 110 (e.g., installed "on top" of the operating system)—or can alternatively be implemented directly by the operating system of the client device 110. The automated assistant client 114 can interact with the natural conversation system 180 implemented locally at the client device 110 or implemented remotely from the client device 110 via one or more of the networks 199 as depicted in FIG. 1 (e.g., at the remote server(s)). The automated assistant client 114 (and optionally by way of its interactions with the remote server(s)) may form what appears to be, from a user's perspective, a logical instance of an automated assistant 115 with which the user may engage in a human-to-computer dialog. An instance of the automated assistant 115 is depicted in FIG. 1, and is encompassed by a dashed line that includes the automated assistant client 114 of the client device 110 and the natural conversation system 180. It thus should be understood that a user that engages with the automated assistant client 114 executing on the client device 110 may, in effect, engage with his or her own logical instance of the automated assistant 115 (or a logical instance of the automated assistant 115 that is shared amongst a household or other group of users). For the sake of brevity and simplicity, the automated assistant 115 as used herein will refer to the automated assistant client 114 executing locally on the client device 110 and/or remotely from the client device 110 (e.g., at the remote server(s) that may additionally or alternatively implement an instance of the natural conversation system 180).

In various implementations, the client device 110 may include a user input engine 111 that is configured to detect user input provided by a user of the client device 110 using one or more user interface input devices. For example, the client device 110 may be equipped with one or more microphones that generate audio data, such as audio data that captures spoken utterances of a user of the client device 110 or other sounds in an environment of the client device 110. Additionally, or alternatively, the client device 110 may be equipped with one or more vision components that are configured to generate vision data capturing images and/or movements (e.g., gestures) detected in a field of view of one or more of the vision components. Additionally, or alternatively, the client device 110 may be equipped with one or more touch sensitive components (e.g., a keyboard and mouse, a stylus, a touch screen, a touch panel, one or more hardware buttons, etc.) that are configured to generate one or more signals that capture touch input directed to the client device 110.

In various implementations, the client device 110 may include a rendering engine 112 that is configured to provide content for audible and/or visual presentation to a user of the client device 110 using one or more user interface output devices. For example, the client device 110 may be equipped with one or more speakers that enable content to be provided for audible presentation to a user of the client device 110 via the one or more speakers of the client device 110. Additionally, or alternatively, the client device 110 may be equipped with a display or projector that enables content to be provided for visual presentation to a user of the client device via the display or projector of client device 110. In other implementations, the client device 110 may be in communication with one or more other computing devices (e.g., via one or more of the networks 199), and user interface input devices and/or user interface output devices of one or more of the other computing devices may be utilized to detect user input provided by a user of the client device 110 and/or to provide content for audible and/or visual presentation to a user of the client device 110, respectively. Additionally, or alternatively, the client device 110 may be equipped with one or more light emitting diodes (LEDs) that can be illuminated in one or more colors to provide an indication that the automated assistant 115 is processing user input from a user of the client device 110, waiting for a user of the client device 110 to continue providing user input, and/or to provide an indication that the automated assistant 115 is performing any other function.

In various implementations, the client device 110 may include one or more presence sensors 113 that are configured to provide, with approval from corresponding user(s), signals indicative of detected presence, particularly human presence. In some of those implementations, the automated assistant 115 can identify the client device 110 (or other computing devices associated with a user of the client device 110) to satisfy a spoken utterance based at least in part of presence of the user at the client device 110 (or at other computing devices associated with the user of the client device 110). The spoken utterance can be satisfied by rendering responsive content (e.g., via the rendering engine 112) at the client device 110 and/or the other computing device(s) associated with the user of the client device 110, by causing the client device 110 and/or the other computing device(s) associated with the user of the client device 110 to be controlled, and/or by causing the client device 110 and/or the other computing device(s) associated with the user of the client device 110 to perform any other action to satisfy the spoken utterance. As described herein, the automated assistant 115 can leverage data determined based on the presence sensors 113 in determining the client device 110 (or the other computing device(s)) based on where a user is near or was recently near, and provide corresponding commands to only the client device 110 (or to the other computing device(s)). In some additional or alternative implementations, the automated assistant 115 can leverage data determined based on the presence sensors 113 in determining whether any user(s) (any users or specific users) are currently proximal to the client device 110 (or the other computing device(s)), and can optionally suppress provision of data to and/or from the client device 110 (or the other computing device(s)) based on the user(s) that are proximal to the client device 110 (or the other computing device(s)).

The presence sensors 113 may come in various forms. For example, the client device 110 can utilize one or more of the user interface input components described above with respect to the user input engine 111 to detect presence of the user (e.g., the microphone(s), the vision component(s), and/or the touch sensitive component(s) described above). Additionally, or alternatively, the client device 110 may be equipped with other types of light-based presence sensors 113, such as passive infrared ("PIR") sensors that measure infrared ("IR") light radiating from objects within their fields of view.

Additionally, or alternatively, in some implementations, the presence sensors 113 may be configured to detect other phenomena associated with human presence or device presence. For example, in some embodiments, the client device 110 may be equipped with a presence sensor 113 that detects various types of wireless signals (e.g., waves such as radio, ultrasonic, electromagnetic, etc.) emitted by, for instance, other computing devices carried/operated by a user (e.g., a mobile device, a wearable computing device, etc.) and/or other computing devices. For example, the client device 110 may be configured to emit waves that are imperceptible to humans, such as ultrasonic waves or infrared waves, that may be detected by other computing device(s) (e.g., via ultrasonic/infrared receivers such as ultrasonic-capable microphones).

Additionally, or alternatively, the client device 110 may emit other types of human-imperceptible waves, such as radio waves (e.g., Wi-Fi, Bluetooth, cellular, etc.) that may be detected by other computing device(s) carried/operated by a user (e.g., a mobile device, a wearable computing device, etc.) and used to determine the user's particular location. In some implementations, GPS and/or Wi-Fi triangulation may be used to detect a person's location, e.g., based on GPS and/or Wi-Fi signals to/from the client device 110. In other implementations, other wireless signal characteristics, such as time-of-flight, signal strength, etc., may be used by the client device 110, alone or collectively, to determine a particular person's location based on signals emitted by the other computing device(s) carried/operated by the user.

Additionally, or alternatively, in some implementations, the client device 110 may perform speaker identification (SID) to recognize a user from their voice. In some implementations, movement of the speaker may then be determined, e.g., by the presence sensors 113 of the client device 110 (and optionally GPS sensors, Soli chips, and/or accelerometers of the client device 110). In some implementations, based on such detected movement, a location of the user may be predicted, and this location may be assumed to be the user's location when any content is caused to be rendered at the client device 110 and/or other computing device(s) based at least in part on proximity of the client device 110 and/or other computing device(s) to the user's location. In some implementations, the user may simply be assumed to be in the last location at which he or she engaged with the automated assistant 115, especially if not much time has passed since the last engagement.

Further, the client device 110 and/or the natural conversation system 180 may include one or more memories for storage of data (e.g., software applications, one or more first-party (1P) agents 171, one or more third-party (3P) agents 172, etc.), one or more processors for accessing the data and executing the data, and/or other components that facilitate communication over one or more of the networks 199, such as one or more network interfaces. In some implementations, one or more of the software applications, the 1P agents 171, and/or the 3P agents 172 can be installed locally at the client device 110, whereas in other implementations one or more of the software applications, the 1P agents 171, and/or the 3P agents 172 can be hosted remotely (e.g., by one or more servers) and can be accessible by the client device 110 over one or more of the networks 199. The operations performed by the client device 110, other computing device(s), and/or by the automated assistant 115 may be distributed across multiple computer systems. The automated assistant 115 may be implemented as, for example, computer programs running on the client device 110 and/or one or more computers in one or more locations that are coupled to each other through a network (e.g., one or more of the networks 199 of FIG. 1).

In some implementations, the operations performed by the automated assistant 115 may be implemented locally at the client device 110 via the automated assistant client 114. As shown in FIG. 1, the automated assistant client 114 may include an automatic speech recognition (ASR) engine 120A1, a natural language understanding (NLU) engine 130A1, a fulfillment engine 140A1, and a text-to-speech (US) engine 150A1. In some implementations, the operations performed by the automated assistant 115 may be distributed across multiple computer systems, such as when the natural conversation system 180 is implemented remotely from the client device 110 as depicted in FIG. 1. In these implementations, the automated assistant 115 may additionally or alternatively utilize ASR engine 120A2, NLU engine 130A2, fulfillment engine 140A2, and US engine 150A2 of the natural conversation system 180 in implementations where the natural conversation system 180 is implemented remotely from the client device 110 (e.g., at the remote server(s)).

Figure 2:
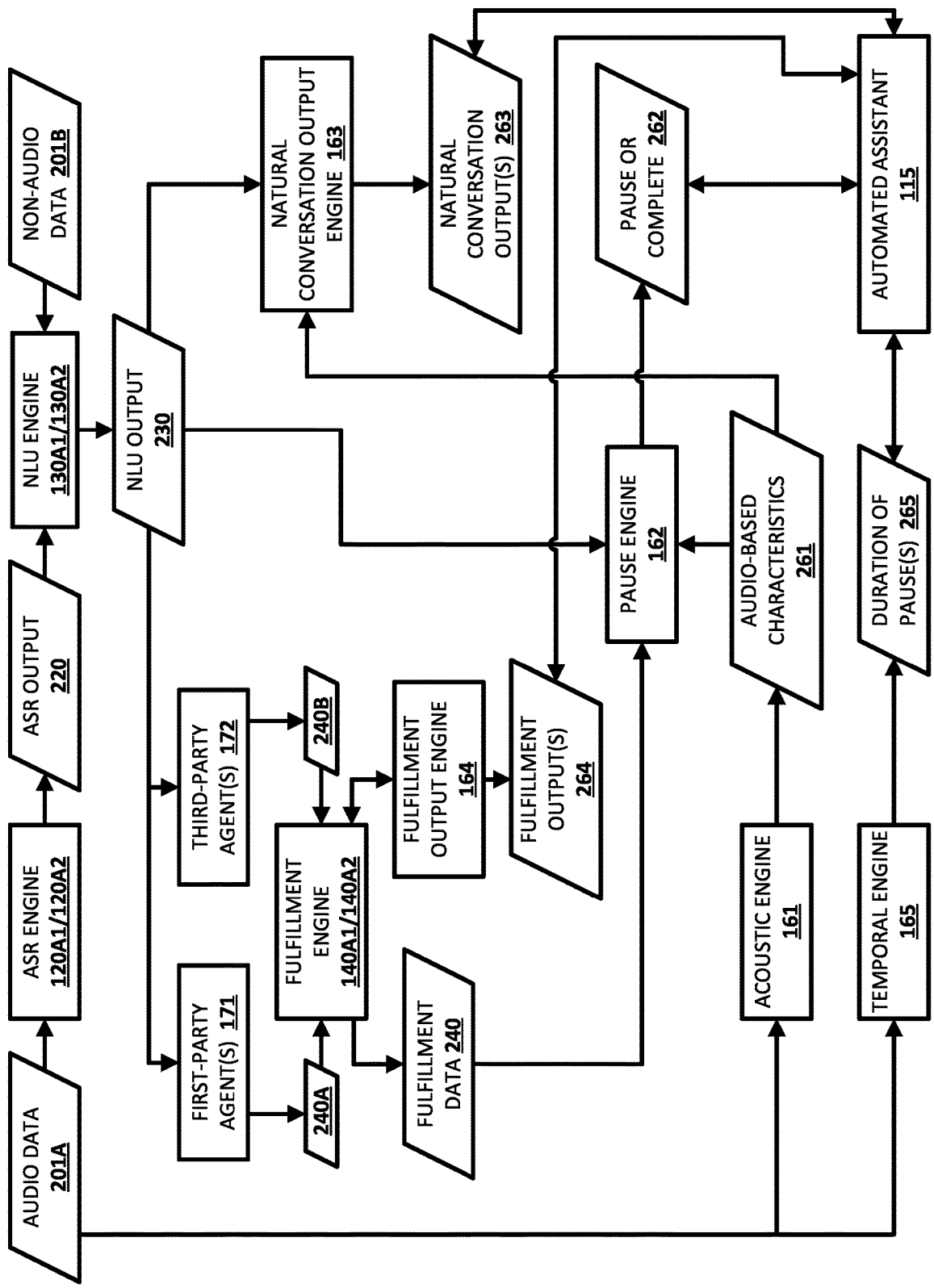
FIG. 2 depicts an example process flow that demonstrates various aspects of the present disclosure using various components of FIG. 1, in accordance with various implementations.

As described in more detail with respect to FIG. 2, each of these engines may be configured to perform one or more functions. For example, the ASR engine 120A1 and/or 120A2 can process, using streaming ASR model(s) stored in machine learning (ML) model(s) database 115A (e.g., a recurrent neural network (RNN) model, a transformer model, and/or any other type of ML model capable of performing ASR), a stream of audio data that captures at least a portion of a spoken utterance and that is generated by microphone(s) of the client device 110 to generate a stream of ASR output. Notably, the streaming ASR model can be utilized to generate the stream of ASR output as the stream of audio data is generated. Further, the NLU engine 130A1 and/or 130A2 can process, using NLU model(s) stored in the ML model(s) database 115A (e.g., a long short-term memory (LSTM), gated recurrent unit (GRU), and/or any other type of RNN or other ML model capable of performing NLU) and/or grammar-based NLU rule(s), the stream of ASR output to generate a stream of NLU output. Moreover, the fulfillment engine 140A1 and/or 140A2 can generate a set of fulfillment outputs based on a stream of fulfillment data generated based on the stream of NLU output. The stream of fulfillment data can be generated using, for example, one or more of the software applications, the 1P agents 171, and/or the 3P agents 172. Lastly, the TTS engine 150A1 and/or 150A2 can process, using TTS model(s) stored in the ML model(s) database 115A, textual data (e.g., text formulated by the automated assistant 115) to generate synthesized speech audio data that includes computer-generated synthesized speech corresponding to the textual data. Notably, the ML model(s) stored in the ML model(s) database 115A can be on-device ML models that are stored locally at the client device 110 or shared ML models that are accessible to both the client device 110 and/or other systems (e.g., in implementations where the natural conversation system is implemented by the remote server(s)).

In various implementations, the stream of ASR output can include, for example, a stream of speech hypotheses (e.g., term hypotheses and/or transcription hypotheses) that are predicted to correspond to spoken utterance(s) (or one or more portions thereof) of a user of the client device 110 that are captured in the stream of audio data, one or more corresponding predicted values (e.g., probabilities, log likelihoods, and/or other values) for each of the speech hypotheses, a plurality of phonemes that are predicted to correspond to spoken utterance(s) of a user of the client device 110 that are captured in the stream of audio data, and/or other ASR output. In some versions of those implementations, the ASR engine 120A1 and/or 120A2 can select one or more of the speech hypotheses as recognized text that corresponds to the spoken utterance (e.g., based on the corresponding predicted values).

In various implementations, the stream of NLU output can include, for example, a stream of annotated recognized text that includes one or more annotations of the recognized text for one or more (e.g., all) of the terms included in the stream of ASR output, one or more predicted intents determined based on the recognized text for one or more (e.g., all) of the terms included in the stream of ASR output, predicted and/or inferred slot values for corresponding parameters associated with each of the one or more predicted intents determined based on the recognized text for one or more (e.g., all) of the terms included in the stream of ASR output, and/or other NLU output. For example, the NLU engine 130A1 and/or 130A2 may include a part of speech tagger (not depicted) configured to annotate terms with their grammatical roles. Additionally, or alternatively, the NLU engine 130A1 and/or 130A2 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

Additionally, or alternatively, the NLU engine 130A1 and/or 130A2 may include a coreference resolver (not depicted) configured to group, or "cluster," references to the same entity based on one or more contextual cues. For example, the coreference resolver may be utilized to resolve the term "them" to "buy theatre tickets" in the natural language input "buy them", based on "theatre tickets" being mentioned in a client device notification rendered immediately prior to receiving input "buy them". In some implementations, one or more components of the NLU engine 130A1 and/or 130A2 may rely on annotations from one or more other components of the NLU engine 130A1 and/or 130A2. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

In various implementations, the stream of fulfillment data can include, for example, one or more fulfillment outputs generated by one or more of the software applications, the 1P agents 171, and/or the 3P agents 172. One or more structured requests generated based on the stream of NLU output can be transmitted to one or more of the software applications, the 1P agents 171, and/or the 3P agents 172, and the one or more of the software applications, the 1P agents 171, and/or the 3P agents 172 can transmit, in response to receiving the one or more of the structured requests, fulfillment output that is predicted to satisfy the spoken utterance. The fulfillment engine 140A1 and/or 140A2 can include the fulfillment output received at the client device 110 in a set of fulfillment outputs that corresponds to the stream of the fulfillment data. Notably, the stream of fulfillment data can be generated as a user of the client device 110 provides the spoken utterance. Further, the fulfillment output engine 164 can select one or more fulfillment outputs, from the stream of fulfillment outputs, and the selected one or more of the fulfillment outputs can be provided for presentation to a user of the client device 110 to satisfy the spoken utterance. The one or more fulfillment outputs can include, for example, audible content that is predicted to be responsive to the spoken utterance and that can be audibly rendered for presentation to a user of the client device 110 via speaker(s), visual content that is predicted to be responsive to the spoken utterance and that can be visually rendered for presentation to a user of the client device 110 via a display, and/or assistant commands that, when executed, cause the client device 110 and/or other computing devices in communication with the client device 110 (e.g., over one or more of the networks 199) to be controlled in response to the spoken utterance.

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 (e.g., over one or more of the networks 199). As another example, a given client device can be utilized by multiple users in a shared setting (e.g., a group of users, a household, a shared living space, etc.).

As described herein, the automated assistant 115 can determine whether to cause natural conversation output to be provided for presentation to a user in response to determining that the user paused in providing of a spoken utterance and/or determining when to fulfill the spoken utterance. In making this determination, the automated assistant can utilize natural conversation engine 160. In various implementations, and as depicted in FIG. 1, the natural conversation engine 160 can include an acoustic engine 161, a pause engine 162, a temporal engine 163, a natural conversation output engine 164, and fulfillment output engine 165.

In some implementations, the acoustic engine 161 can determine, based on processing the stream of audio data, audio-based characteristics. In some versions of those implementations, the acoustic engine 161 can process, using an audio-based ML model stored in the ML model(s) database 115A, the stream of audio data to determine the audio-based characteristics. In additional or alternative implementations, the acoustic engine 161 can process, using one or more rules, the stream of audio data to determine the audio-based characteristics. The audio-based characteristics can include, for example, prosodic properties associated with spoken utterance(s) captured in the stream of audio data and/or other audio-based characteristics. The prosodic properties can include, for example, one or more properties of syllables and larger units of speech, including linguistic functions such as intonation, tone, stress, rhythm, tempo, pitch, elongated syllables, pause, grammar(s) associated with pause, and/or other audio-based characteristics that may be derived from processing the stream of audio data. Further, the prosodic properties can provide an indication of, for example: emotional state; form (e.g., statement, question, or command); irony; sarcasm; speech cadence; and/or emphasis. In other words, the prosodic properties are features of speech that are independent of a given user's individual voice characteristics, and that can be dynamically determined during a dialog session based on an individual spoken utterances and/or a combination of multiple spoken utterances.

In some implementations, the pause engine 162 can determine whether a user of the client device 110 has paused in providing a spoken utterance that is captured in the stream of audio data or has completed providing of the spoken utterance. In some versions of those implementations, the pause engine 162 can determine that the user of the client device 110 has paused in providing of the spoken utterance based on processing of the audio-based characteristics determine using the acoustic engine 161. For example, the pause engine 162 can process, using an audio-based classification ML model stored in the ML model(s) database 115A, the audio-based characteristics to generate output and determine, based on the output generated using the audio-based classification ML model, whether the user of the client device 110 has paused in providing of the spoken utterance or has completed providing of the spoken utterance. The output can include, for example, one or more predicted measures (e.g., binary values, log likelihoods, probabilities, etc.) that are indicative of whether the user of the client device 110 has paused in providing of the spoken utterance or has completed providing of the spoken utterance. For instance, assume a user of the client device 110 provides a spoken utterance of "call Arnolllld's", where the "llll" indicates an elongated syllable included in the spoken utterance. In this example, the audio-based characteristics can include an indication that the spoken utterance includes the elongated syllable, and, as a result, the output generated using the audio-based classification ML model may indicate that the user has not completed providing of the spoken utterance.

In additional or alternative versions of those implementations, the pause engine 162 can determine that the user of the client device 110 has paused in providing of the spoken utterance based on the stream of NLU data generated using the NLU engine 130A1 and/or 130A2. For example, the pause engine 162 can process the stream of audio data whether the user of the client device 110 has paused in providing of the spoken utterance or has completed providing of the spoken utterance based on the predicted intent(s)

and/or the predicted slot values for the predicted and/or inferred slot values for the corresponding parameters associated with the predicted intent(s). For instance, assume a user of the client device 110 provides a spoken utterance of "call Arnollld's", where the "llll" indicates an elongated syllable included in the spoken utterance. In this example, the stream of NLU data can include a predicted intent of "call" and a slot value for an entity parameter of "Arnold". However, in this example, even though the automated assistant 115 may have access to a contact entry associated with an entity "Arnold" (such that the spoken utterance can be fulfilled) the automated assistant 115 may not initiate the call to the entity "Arnold" based on the elongated syllables included in the audio-based characteristics determined based on processing the spoken utterance. In contrast, in this example, had the user not provided "Arnollld's" with the elongated syllables and/or had the user provided an explicit command to cause the automated assistant 115 to initiate fulfillment of the spoken utterance (e.g., "call Arnold now", "call Arnold immediately", or the like), the pause engine 162 may determine that the user of the client device 110 has completed providing of the spoken utterance.

In some implementations, the natural conversation output engine 163 can determine natural conversation output to be provided for presentation to a user of the client device in response to determining that the user has paused in providing of the spoken utterance. In some versions of those implementations, the natural conversation output engine 163 can determine a set of natural conversation outputs, and can select one or more of the natural conversation outputs (e.g., randomly or cycling through the set of natural conversation outputs), from among the set of natural conversation outputs, to be provided for presentation to the user (e.g., audible presentation via one or more speakers of the client device 110) based on the NLU measures associated with the stream of NLU data and/or the audio-based characteristics. In some further versions of those implementations, a superset of natural conversation outputs can be stored in one or more databases (not depicted) accessible by the client device 110 (e.g., as textual data converted to synthesized speech audio data (e.g., using the TTS engine 150A1 and/or 150A2) and/or as synthesized speech audio data), and the set of natural conversation outputs can be generated from the superset of natural conversation outputs based on NLU measures associated with the stream of NLU data and/or the audio-based characteristics.

These natural conversation outputs can be implemented in furtherance of a dialog session during which the spoken utterance , but are not necessarily implemented as fulfillment of the spoken utterance. For example, the natural conversation output can include request the user confirm an indication of a desire to continue interacting with the automated assistant 115 (e.g., "Are you still there?", etc.), request that the user provide additional user input in furtherance of a dialog session between the user and the automated assistant 115 (e.g., "Who did you want me to call?", etc.), filler speech (e.g., "Mmmhmm", "Uh huhh", "Alright", etc.). In various implementations, the natural conversation engine 163 can utilize one or more language models stored in the ML model(s) database 115A in generating the set of natural conversation outputs. In other implementations, the natural conversation engine 163 can obtain the set of natural conversation outputs from a remote system (e.g., the remote server(s)), and store the set of natural conversation outputs in on-device memory of the client device 110.

Figure 5A:
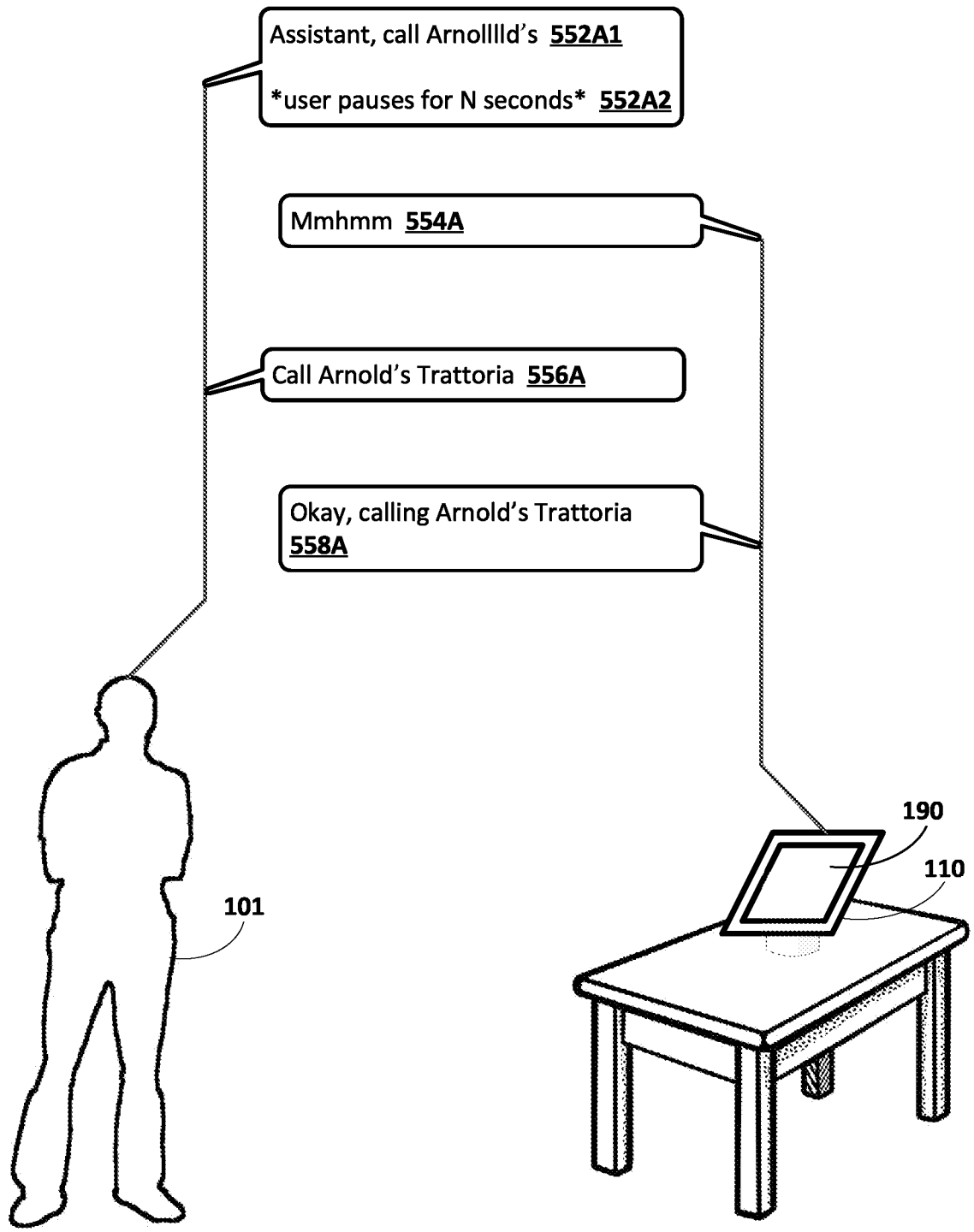
FIG. 5A, FIG. 5B, FIG. 5C, FIG. 5D, and FIG. 5E depict various non-limiting examples of determining whether to cause natural conversation output to be provided for presentation to a user in response to determining that the user paused in providing of a spoken utterance and/or determining when to fulfill the spoken utterance, in accordance with various implementations.
Figure 5B:
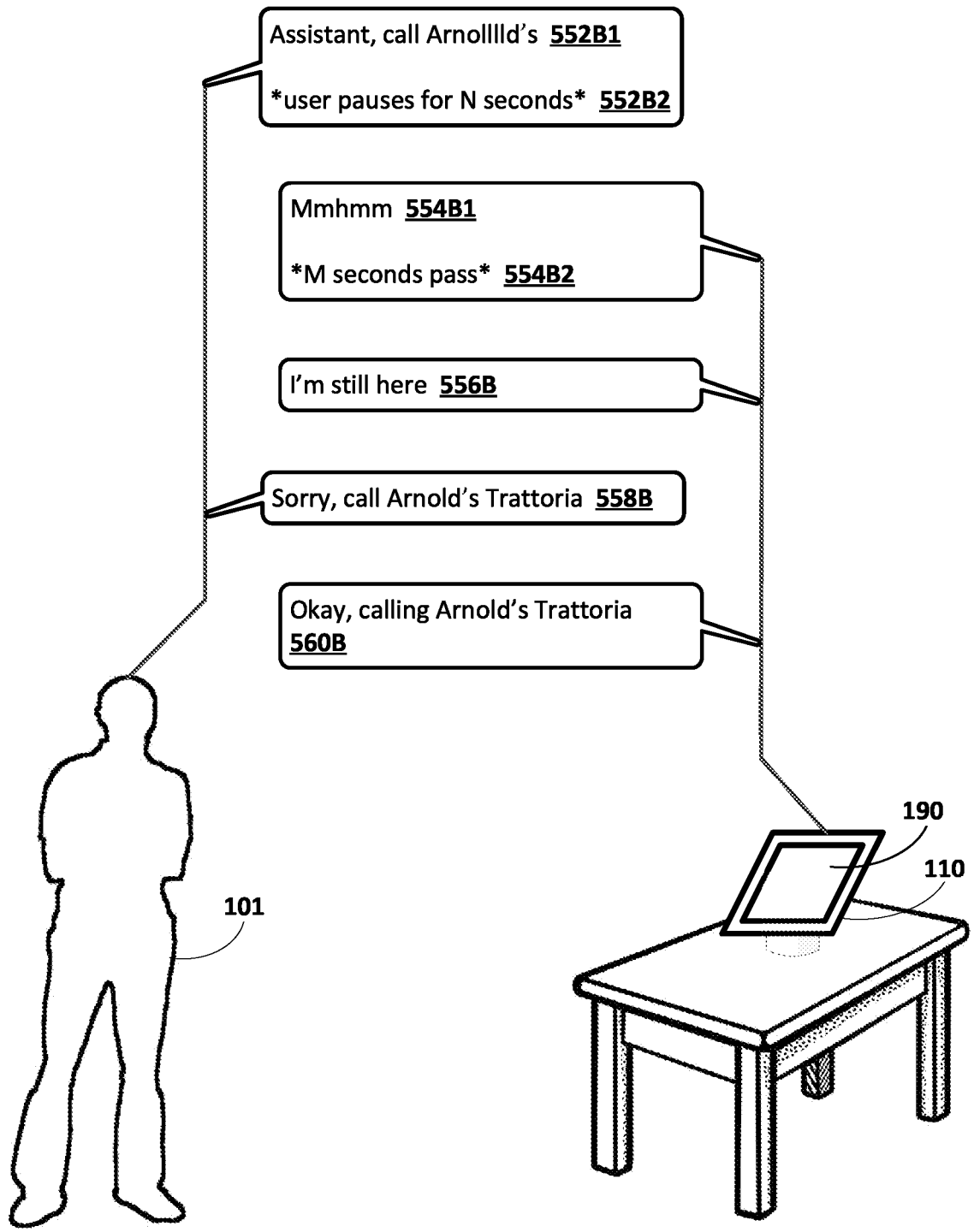
Figure 5C:
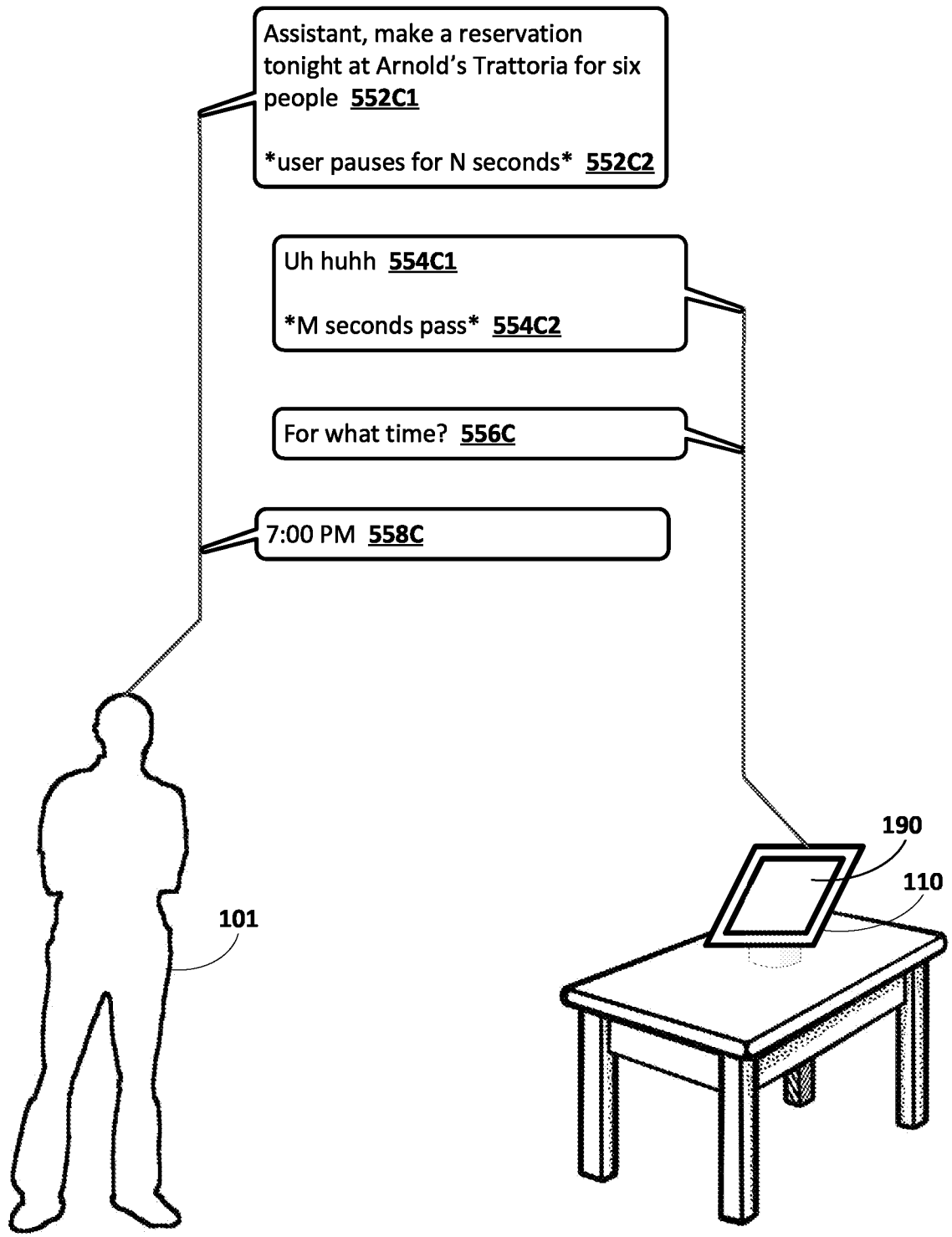

In some implementations, the fulfillment output engine 164 can select one or more fulfillment outputs, from the stream of fulfillment output, to be provided for presentation to a user of the client device in response to determining that the user has completed providing of the spoken utterance, or in response to determining that the user has not completed providing of the spoken utterance, but that the spoken utterance should nonetheless be fulfilled (e.g., as described with respect to FIG. 5C). Although the 1P agents 171 and the 3P agents 172 are depicted as being implemented over one or more of the networks 199 in FIG. 1, it should be understood that is for the sake of example and is not meant to be limiting. For instance, one or more of the 1P agents 171 and/or the 3P agents 172 can be implemented locally at the client device 110, and the stream of NLU output can be transmitted to one or more of the 1P agents 171 and/or the 3P agents 172 via an application programming interface (API), and fulfillment output from one or more of the 1P agents 171 and/or the 3P agents 172 can be obtained via the API and incorporated into the stream of fulfillment data Additionally, or alternatively, one or more of the 1P agents 171 and/or the 3P agents 172 can be implemented remotely from the client device 110 (e.g., at 1P server(s) and/or 3P server(s), respectively), and the stream of NLU output can be transmitted to one or more of the 1P agents 171 and/or the 3P agents 172 via one or more of the networks 199, and fulfillment output from one or more of the 1P agents 171 and/or the 3P agents 172 can be obtained via one or more of the networks 199 and incorporated into the stream of fulfillment data.

For example, the fulfillment output engine 164 can select one or more fulfillment outputs, from the stream of fulfillment data, based on NLU measures associated with the stream of NLU data and/or fulfillment measures associated with the stream of fulfillment data. The NLU measures can be, for example, probabilities, log likelihoods, binary values, etc. that are indicative of how confident the NLU engine 130A1 and/or 130A2 is that predicted intent(s) correspond to an actual intent of a user that provided the spoken utterance(s) captured in the stream of audio data and/or how confident inferred and/or predicted slot value(s) for parameter(s) associated with the predicted intent(s) corresponds to actual slot value(s) for the parameter(s) associated with the predicted intent(s). The NLU measures can be generated as the NLU engine 130A1 and/or 130A2 generates the stream of NLU output, and can be included in the stream of NLU output. The fulfillment measures can be, for example, probabilities, log likelihoods, binary values, etc. that are indicative of how confident the fulfillment engine 140A1 and/or 140A2 is that predicted fulfillment output(s) correspond to a desired fulfillment of the user. The fulfillment measures can be generated as one or more of the software applications, the 1P agents 171 and/or the 3P agents 172 generate the fulfillment outputs and can be incorporated into the stream of fulfillment data, and/or can be generated as the fulfillment engine 140A1 and/or 140A2 processes the fulfillment data received from one or more of the software applications, the 1P agents 171 and/or the 3P agents 172 and can be incorporated into the stream of fulfillment data.

In some implementations, and in response to determining that the user has paused in providing of the spoken utterance, the temporal engine 165 can determine a duration of the pause in providing of the spoken utterance and/or a duration of any subsequent pause. The automated assistant 115 can cause the natural conversation output engine 163 to leverage one or more of these durations of pauses in the selecting the natural conversation output to be provided for presentation to a user of the client device 110. For example, assume a user of the client device 110 provides a spoken utterance of "call Arnollld's", where the "llll" indicates an elongated syllable included in the spoken utterance. Further assume that it is determined the user has paused in providing of the spoken utterance. In some implementations, natural conversation output may be provided for presentation to the user in response to determining that a user of the client device 110 has paused in providing of the spoken utterance (e.g., by audibly rendering "Mmmhmm" or the like). However, in other implementations, the natural conversation output may be provided for presentation to the user in response to the temporal engine 165 determining a threshold duration of time has lapsed since the user first paused. Moreover, further assume that the user of the client device 110 does not continue providing of the spoken utterance in response to the natural conversation output being provided for presentation. In this example, additional natural conversation output may be provided for presentation to the user in response to the temporal engine 165 determining an additional threshold duration of time has lapsed since the user first paused (or an additional threshold duration of time has lapsed since the natural conversation output was provided for presentation to the user). Accordingly, in providing the additional natural conversation output for presentation to the user, the natural conversation output engine 163 can select different natural conversation output that requests the user of the client device 110 complete the spoken utterance (e.g., "You were saying?", "Did I miss something?", etc.) or requests the user of the client device 110 provide particular slot value(s) for the predicted intent(s) (e.g., "Who did you want to call?", "And how many people was the reservation for?", etc.).

In various implementations, and while the automated assistant 115 is waiting for a user of the client device 110 to complete the spoken utterance, the automated assistant 115 can optionally cause fulfillment outputs in the set of fulfillment outputs to be partially fulfilled. For example, the automated assistant 115 can establish a connection with one or more of the software application, the 1P agents 171, the 3P agents 172, and/or an additional computing device in communication with the client device 110 (e.g., via one or more of the networks 199), such as other client devices associated with a user of the client device 110, smart networked devices, etc., based on one or more fulfillment outputs included the set of fulfillment outputs, can cause synthesized speech audio data that includes synthesized speech to be generated (but not audibly rendered), can cause graphical content to be generated (but not visually rendered), and/or perform any other partial fulfillment of one or more of the fulfillment outputs. As a result, latency in causing the fulfillment output to be provided for presentation to a user of the client device 110 can be reduced.

Turning now to FIG. 2, an example process flows that demonstrates various aspects of the present disclosure using various components of FIG. 1 is depicted. The ASR engine 120A1 and/or 120A2 can process, using a streaming ASR model stored in the ML model(s) database 115A, a stream of audio data 201A to generate a stream of ASR output 220. The NLU engine 130A1 and/or 130A2 can process the stream of ASR output 220, using an NLU model stored in the ML model(s) database 115A, to generate a stream of NLU output 230. In some implementations, the NLU engine 130A1 and/or 130A2 can additionally or alternatively process a stream of non-audio data 201B in generating the stream of NLU output 230. The stream of non-audio data 201B can include, a stream of vision data generated by vision component(s) of the client device 110, a stream of touch inputs provided by a user via touch sensitive component(s) of the client device 110, a stream of typed input provided by a user via touch sensitive component(s) of the client device 110 or a peripheral device (e.g., a mouse and keyboard), and/or any other non-audio data generated by any other user interface input device of the client device 110. In some implementations, the 1P agent(s) 171 can process the stream of NLU output to generate 1P fulfillment data 240A. In additional or alternative implementations, the 3P agent(s) 172 can process the stream of NLU output 230 to generate 3P fulfillment data 240B. The fulfillment engine 140A1 and/or 140A2 can generate a stream of fulfillment data 240 based on the 1P fulfillment data 240A and/or the 3P fulfillment data 240B (and optionally other fulfillment data generated based on one or more software application accessible at the client device 110 processing the stream of NLU output 230). Further, the acoustic engine 161 can process the stream of audio data 201A to generate audio-based characteristics 261 associated with the stream of audio data 201A, such as audio-based characteristics 261 of one or more spoken utterances (or portions thereof) included in the stream of audio data 201A.

The pause engine 162 can process the stream of NLU output 230 and/or the audio-based characteristics 261 to determine whether a user of the client device has paused in providing of a spoken utterance captured in the stream of audio data 201A or has completed providing of the spoken utterance captured in the stream of audio data 201A as indicated at block 262. The automated assistant 115 can determine whether to provide natural conversation output or fulfillment output based on whether block 262 indicates the user has paused in providing of the spoken utterance or has completed providing of the spoken utterance. For example, assume that the automated assistant 115 determines, based on the indication at block 262, that the user has paused in providing of the spoken utterance. In this example, the automated assistant 115 can cause the natural conversation output engine 163 to select natural conversation output 263, and the automated assistant 115 can cause the natural conversation output 263 to be provided for presentation to a user of the client device 110. In contrast, assume that the automated assistant 115 determines, based on the indication at block 262, that the user has completed providing of the spoken utterance. In this example, the automated assistant 115 can cause the fulfillment output engine 164 to select one or more fulfillment outputs 264, and the automated assistant 115 can cause the one or more fulfillment outputs 264 to be provided for presentation to a user of the client device 110. In some implementations, the automated assistant 115 can consider a duration of one or more pauses 265 determined by the temporal engine 165 in determining whether to cause the natural conversation output 263 to be provided for presentation to a user of the client device 110 or to cause the one or more fulfillment outputs 264 to be provided for presentation to a user of the client device 110. In these implementations, the natural conversation output 263 and/or the one or more fulfillment outputs 264 can be adapted based on the duration of the one or more pauses. Although particular functionality and embodiments are described with respect to FIGS. 1 and 2, it should be understood that is for the sake of example and is not meant to be limiting. For example, additional functionality and embodiments are described hereinbelow with respect to FIGS. 3, 4, 5A-5E, and 6.

Figure 3:
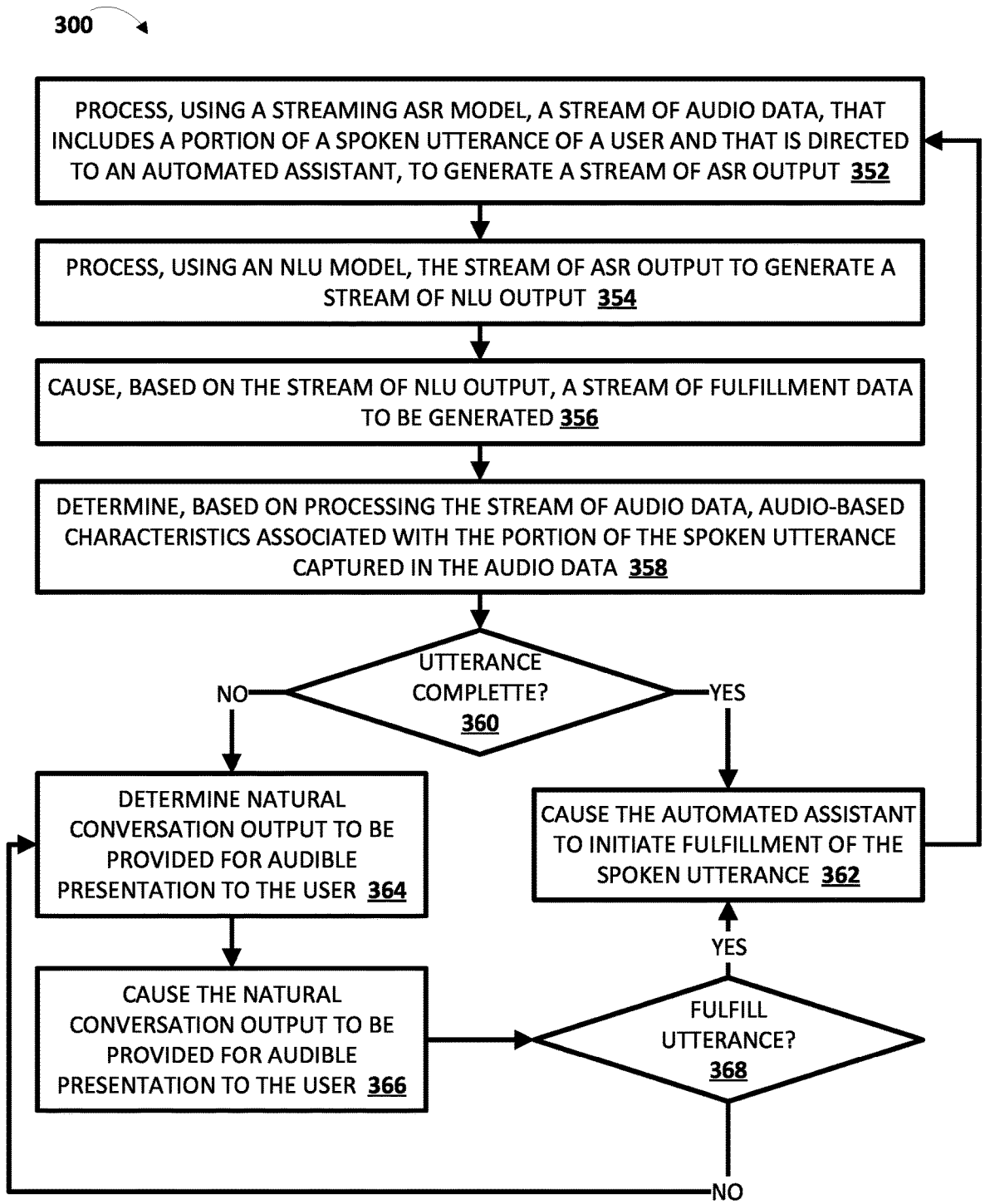
FIG. 3 depicts a flowchart illustrating an example method of determining whether to cause natural conversation output to be provided for presentation to a user in response to determining that the user paused in providing of a spoken utterance and/or determining when to fulfill the spoken utterance, in accordance with various implementations.

Turning now to FIG. 3, a flowchart illustrating an example method 300 of determining whether to cause natural conversation output to be provided for presentation to a user in response to determining that the user paused in providing of a spoken utterance and/or determining when to fulfill the spoken utterance is depicted. For convenience, the operations of the method 300 are described with reference to a system that performs the operations. This system of the method 300 includes one or more processors, memory, and/or other component(s) of computing device(s) (e.g., client device 110 of FIGS. 1 and 5A-5E, computing device 610 of FIG. 6, one or more servers, and/or other computing devices). Moreover, while operations of the method 300 are shown in a particular order, this is not meant to be limiting. One or more operations may be reordered, omitted, and/or added.

At block 352, the system processes, using a streaming ASR model, a stream of audio data, that includes a portion of a spoken utterance of a user and that is directed to an automated assistant, to generate a stream of ASR output. The stream of audio data can be generated by microphone(s) of a client device of the user and during a dialog session with the automated assistant implemented at least in part at the client device. In some implementations, the system may process the stream of audio data in response to determining that the user has invoked the automated assistant via one or more particular words and/or or phrases (e.g., hotwords, such as "Hey Assistant", "Assistant", etc.), actuation of one or more buttons (e.g., software and/or hardware buttons), one or more gestures captured by vision component(s) of the client device that, when detect, invoke the automated assistant, and/or by any other means. At block 354, the system processes, using an NLU model, the stream of ASR output to generate a stream of NLU output. At block 356, the system causes, based on the stream of NLU output, a stream of fulfillment data to be generated. At block 358, the system determines, based on processing the stream of audio data, audio-based characteristics associated with the portion of the spoken utterance captured in the audio data. The audio-based characteristics can include, for example, one or more prosodic properties associated with the portion of the spoken utterance (e.g., intonation, tone, stress, rhythm, tempo, pitch, pause, and/or other prosodic properties) and/or other audio-based characteristics that can be determined based on processing the stream of audio data. The operations of blocks 352-358 are described in more detail herein (e.g., with respect to FIGS. 1 and 2).

At block 360, the system determines, based on the stream of NLU output and/or the audio-based characteristics associated with the portion of the spoken utterance captured in the audio data, whether the user has paused in providing of the spoken utterance or has completed providing of the spoken utterance. In some implementations, the system can process, using an audio-based classification ML model, the audio-based characteristics to generate output, and the system can determine whether the user has paused in providing of the spoken utterance or has completed providing of the spoken utterance based on the output generated using the audio-based classification ML model. The output generated using the audio-based classification ML model can include one or more predicted measures (e.g., binary values, probabilities, log likelihoods, and/or other measures) that are indicative of whether the user has paused in providing of the spoken utterance or has completed providing of the spoken utterance. For example, assume the output includes a first probability of 0.8 associated with a prediction of the user having paused in providing of the spoken utterance and a second probability of 0.6 associated with a prediction of the user having completed providing of the spoken utterance. In this example, the system can determine that the user has paused in providing of the spoken utterance based on the predicted measures. In additional or alternative implementations, the system can process or analyze the stream of NLU output to determine whether the user has paused in providing of the spoken utterance or has completed providing of the spoken utterance. For example, if the system determines that NLU measures associated with predicted intent(s) and/or inferred and/or predicted slot value(s) for corresponding parameter(s) associated with the predicted intent(s) fail to satisfy an NLU measure threshold, or if the system determines that slot value(s) for the corresponding parameter(s) associated with the predicted intent(s) are unknown, then the automated assistant may determine that the user has paused in providing of the spoken utterance. Notably, in various implementations, the system can determine whether the user has paused in providing of the spoken utterance or has completed providing of the spoken utterance based on both the audio-based characteristics and the stream of NLU data. For example, if the system determines that the spoken utterance can be fulfilled based on the stream of NLU data, but that the audio-based characteristics indicate that the user has paused in providing of the spoken utterance, then the system may determine that the user has paused in providing of the spoken utterance since any additional portion of the spoken utterance that may be provided by the user may change how the user desires the spoken utterance to be fulfilled.

If, at an iteration of block 360, the system determines that the user has completed providing of the spoken utterance, the system can proceed to block 362. At block 362, the system causes the automated assistant to initiate fulfillment of the spoken utterance. For example, the system can select one or more fulfillment outputs, from the stream of fulfillment data, that is predicted to satisfy the spoken utterance, and cause the one or more fulfillment outputs to be provided for presentation to the user via the client device or an additional computing device in communication with the client device. As noted above with respect to FIG. 1, the one or more fulfillment outputs can include, for example, audible content that is predicted to be responsive to the spoken utterance and that can be audibly rendered for presentation to a user of the client device via speaker(s), visual content that is predicted to be responsive to the spoken utterance and that can be visually rendered for presentation to a user of the client device via a display, and/or assistant commands that, when executed, cause the client device and/or other computing devices in communication with the client device to be controlled in response to the spoken utterance. The system can return to block 352 and perform an additional iteration of the method 300 of FIG. 3.

If, at an iteration of block 360, the system determines that the user has paused in providing of the spoken utterance, the system can proceed to block 364. At block 364, the system determines natural conversation output to be provided for audible presentation to the user. Further, at block 366, the system can cause the natural conversation output to be provided for audible presentation to the user. The natural conversation output can be selected from among a set of natural conversation outputs stored in on-device memory of the client device based on the NLU measures associated with the stream of NLU data and/or the audio-based characteristics. In some implementations, one or more of the natural conversation outputs included in the set of natural conversation outputs can correspond to textual data. In these implementations, the textual data associated with the selected natural conversation output can be processed, using a TTS model, to generate synthesized speech audio data that includes synthesized speech corresponding to the selected natural conversation output, and the synthesized speech audio data can be audibly rendered for presentation to the user via speaker(s) of the client device or an additional computing device.

In additional or alternative implementations, one or more of the natural conversation outputs included in the set of natural conversation outputs can correspond to synthesized speech audio data that includes synthesized speech corresponding to the selected natural conversation output, and the synthesized speech audio data can be audibly rendered for presentation to the user via speaker(s) of the client device or an additional computing device. Notably, in various implementations, in providing the natural conversation output for audible presentation to the user, a volume at which the natural conversation output is played back for the user can be at a lower volume that other output that is audibly rendered for presentation to the user. Moreover, in various implementations, in providing the natural conversation output for audible presentation to the user, one or more automated assistant components can remain active while the natural conversation output is being provided for audible presentation to the user (e.g., the ASR engine 120A1 and/or 120A2, the NLU engine 130A1 and/or 130A2, and/or the fulfillment engine 140A2 and/or 140A2) to enable the automated assistant to continue processing the stream of audio data.

At block 368, the system determines whether to fulfill the spoken utterance subsequent to causing the natural conversation output to be provided for audible presentation to the user. In some implementations, the system can determine to fulfill the spoken utterance in response to determining that the user completed providing of the spoken utterance subsequent to causing the natural conversation output to be provided for audible presentation to the user. In these implementations, the stream of ASR output, the stream of NLU output, and the stream of fulfillment data can be updated based on the user completing providing of the spoken utterance. In additional or alternative implementations, the system can determine to fulfill the spoken utterance in response to determining that the spoken utterance can be fulfilled based on the portion of the spoken utterance even if the user did not complete providing of the spoken utterance based one or more costs associated with causing the automated assistant to initiate fulfillment of the spoken utterance (e.g., as described in more detail with respect to FIG. 5C).

If, at an iteration of block 368, the system determines to fulfill the spoken utterance subsequent to causing the natural conversation output to be provided for audible presentation to the user, then the system proceeds to block 362 to cause the automated assistant to initiate fulfillment of the spoken utterance as described above. If, at an iteration of block 368, the system determines not to fulfill the spoken utterance subsequent to causing the natural conversation output to be provided for audible presentation to the user, then the system returns to block 364. At this subsequent iteration of block 364, the system can determine additional natural conversation output to be provided for audible presentation to the user. Notably, the additional conversation output to be provided for audible presentation to the user selected at this subsequent iteration of block 364 may differ from the natural conversation output to be provided for audible presentation to the user selected at a prior iteration of block 364. For instance, the natural conversation output to be provided for audible presentation to the user that is selected at a prior iteration of block 364 may be provided as an indication to the user that the automated assistant is still listening and waiting for the user to complete the spoken utterance (e.g., "Mmhmm", "Okay", "Uh huhhh", etc.). However, the natural conversation output to be provided for audible presentation to the user that is selected at this subsequent iteration of block 364 may also be provided as an indication to the user that the automated assistant is still listening and waiting for the user to complete the spoken utterance, but also more explicitly prompt the user to complete the spoken utterance or provide particular input (e.g., "Are you still there?", "How many people for the reservation?", etc.). The system can continue performing iterations of blocks 364-368 until the system determines to fulfill the spoken utterance at an iteration of block 368 and the system proceeds to block 362 to cause the automated assistant to initiate fulfillment of the spoken utterance as described above.

In various implementations, the one or more predicted measures that are indicative of whether the user has paused in providing of the spoken utterance or has completed providing of the spoken utterance can be utilized in determining whether and/or when to provide natural conversation output for audible presentation to the user. For example, assume that output generated using the audio-based classification ML model includes a first probability of 0.8 associated with a prediction of the user having paused in providing of the spoken utterance and a second probability of 0.6 associated with a prediction of the user having completed providing of the spoken utterance. Further assume that the first probability of 0.8 satisfies a pause threshold that indicates the system is highly confident that the user has paused in providing of the spoken utterance. Accordingly, at a first iteration of block 364, the system can cause a speech back channel to be utilized as the natural conversation output (e.g., "uh huh"). Further, at a second iteration of block 364, the system can cause another speech back channel to be utilized as the natural conversation output because the system is highly confident that the user has paused in providing of the spoken utterance (e.g., "Mmmhmm" or "I'm here"). In contrast, assume that output generated using the audio-based classification ML model includes a first probability of 0.5 associated with a prediction of the user having paused in providing of the spoken utterance and a second probability of 0.4 associated with a prediction of the user having completed providing of the spoken utterance. Further assume that the first probability of 0.5 fails to satisfy a pause threshold that indicates the system is highly confident that the user has paused in providing of the spoken utterance. Accordingly, at a first iteration of block 364, the system can cause a speech back channel to be utilized as the natural conversation output (e.g., "uh huh"). However, at a second iteration of block 364, and rather than causing another speech back channel disfluency to be utilized as the natural conversation output, the system may request that the user confirm a predicted intent that is predicted based on processing of the spoken utterance (e.g., "Did you want to call someone?"). Notably, in determining the natural conversation outputs to be provided for audible presentation to the user, the system can randomly select given natural conversation output to be provided for audible presentation to the user from among a set of natural conversation outputs, cycle through the set of natural conversation outputs in selecting the given natural conversation output to be provided for audible presentation to the user, or determine the natural conversation outputs to be provided for audible presentation to the user in any other manner.

Although FIG. 3 is described herein without considering any temporal aspects in causing the natural conversation output to be provided for audible presentation to the user, it should be understood that is for the sake of example. In various implementations, and as described below with respect to FIG. 4, the system may only cause instances of the natural conversation output to be provided for audible presentation to the user based on various thresholds of time. For example, in the method 300 of FIG. 3, the system may cause an initial instance of the natural conversation output to be provided for audible presentation to the user based in response to determining a first threshold duration of time has lapsed since the user paused in providing the spoken utterance. Further, in the method 300 of FIG. 3, the system may cause a subsequent instance of the natural conversation output to be provided for audible presentation to the user based in response to determining a second threshold duration of time has lapsed since the initial instance of the natural conversation output was provided for audible presentation to the user. In this example, the first threshold duration of time and the second threshold duration of time may be the same or differ, and may correspond to any positive integer number and/or fraction thereof (e.g., 2 seconds, 2.5 seconds, 3 seconds, etc.).

Figure 4:
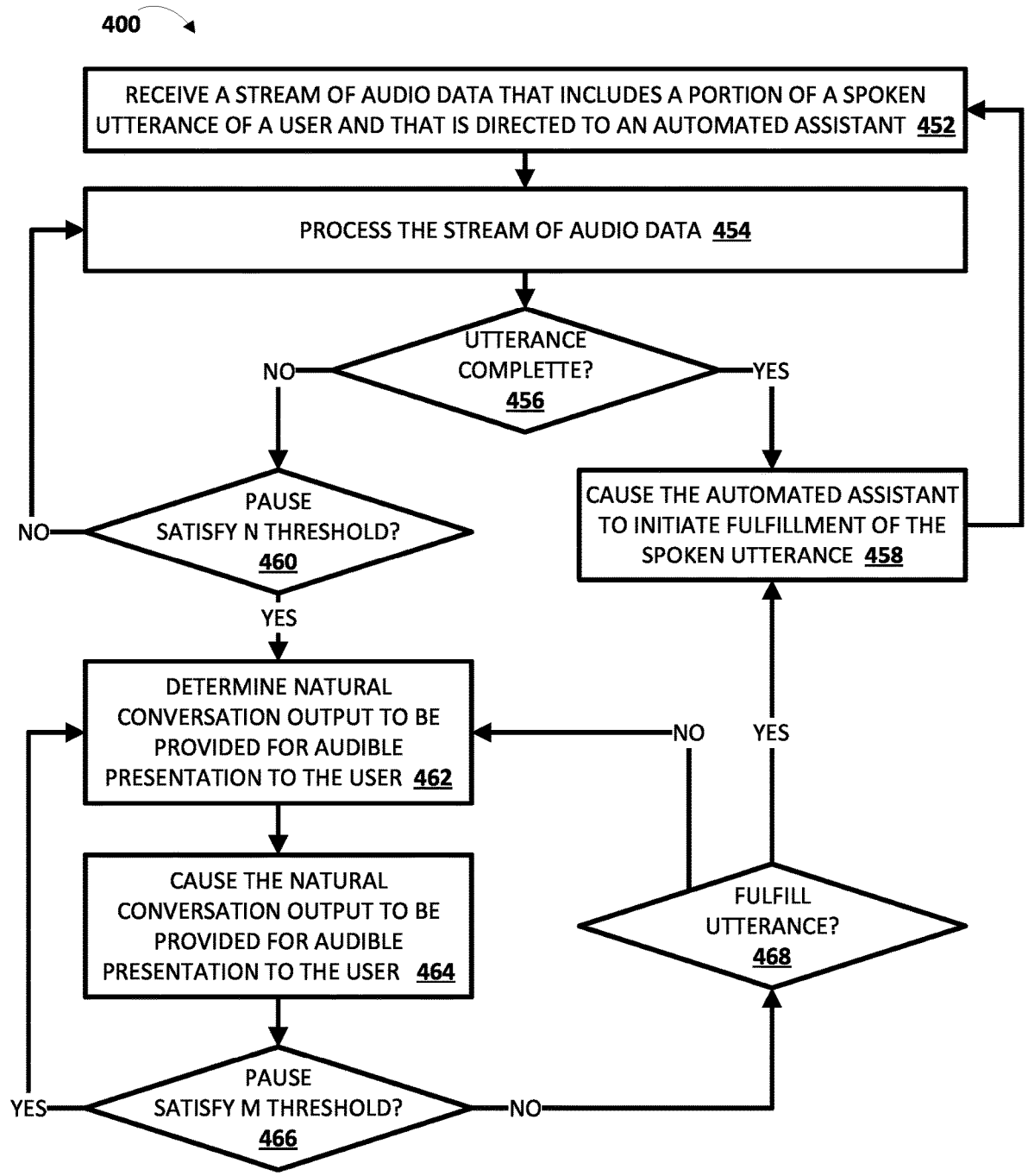
FIG. 4 depicts a flowchart illustrating another example method of determining whether to cause natural conversation output to be provided for presentation to a user in response to determining that the user paused in providing of a spoken utterance and/or determining when to fulfill the spoken utterance, in accordance with various implementations.

Turning now to FIG. 4, a flowchart illustrating another example method 400 of determining whether to cause natural conversation output to be provided for presentation to a user in response to determining that the user paused in providing of a spoken utterance and/or determining when to fulfill the spoken utterance is depicted. For convenience, the operations of the method 400 are described with reference to a system that performs the operations. This system of the method 400 includes one or more processors, memory, and/or other component(s) of computing device(s) (e.g., client device 110 of FIGS. 1 and 5A-5E, computing device 610 of FIG. 6, one or more servers, and/or other computing devices). Moreover, while operations of the method 400 are shown in a particular order, this is not meant to be limiting. One or more operations may be reordered, omitted, and/or added.

At block 452, the system receives a stream of audio data that includes a portion of a spoken utterance of a user and that is directed to an automated assistant. The stream of audio data can be generated by microphone(s) of a client device of the user and during a dialog session with the automated assistant implemented at least in part at the client device. At block 454, the system processes the stream of audio data. The system can process the stream of audio data in the same or similar manner described above with respect to the operations blocks 352-358 of the method 300 of FIG. 3.

At block 456, the system determines, based on a stream of NLU output and/or audio-based characteristics associated with the portion of the spoken utterance captured in the audio data determined based on processing the spoken utterance at block 454, whether the user has paused in providing of the spoken utterance or has completed providing of the spoken utterance. The system can make this determination in the same or similar manner described with respect to the operations of block 360 of the method 300 of FIG. 3. If, at an iteration of block 456, the system determines that the user has completed providing of the spoken utterance, the system can proceed to block 458. At block 458, the system causes the automated assistant to initiate fulfillment of the spoken utterance in the same or similar manner described with respect to the operations of block 360 of the method 300 of FIG. 3. The system returns to block 452 and perform an additional iteration of the method 400 of FIG. 4. If, at an iteration of block 456, the system determines that the user has paused in providing of the spoken utterance, the system can proceed to block 460.

At block 460, the system determines whether the pause of the user in providing the spoken utterance satisfies an N threshold, where N is any positive integer number and/or fraction thereof (e.g., 2 seconds, 2.5 seconds, 3 seconds, etc.). If, at an iteration of block 460, the system determines that the pause of the user in providing the spoken utterance fails to satisfy the N threshold, then the system returns to block 454 and continues processing the stream of the audio data. If, at an iteration of block 460, the system determines the pause of the user in providing the spoken utterance satisfies the N threshold, then the system proceeds to block 460. At block 462, the system determines natural language conversation output to be provided for audible presentation to the user. At block 464, the system causes the natural conversation output to be provided for audible presentation to the user. The system can perform the operations of blocks 462 and 464 in the same or similar manner described above with respect to the operations of blocks 364 and 366 of the method 300 of FIG. 3, respectively. Put another way, in implementations that utilize one or more aspects of the method 400 of FIG. 4 and in contrast with the method 300 of FIG. 3, the system may wait N seconds after the user first paused in providing of the spoken utterance before causing the natural conversation output to be provided for audible presentation to the user.

At block 466, the system determines whether the pause of the user in providing the spoken utterance, and subsequent to causing the natural conversation output to be provided for audible presentation to the user, satisfies an M threshold, where M is any positive integer number and/or fraction thereof (e.g., 2 seconds, 2.5 seconds, 3 seconds, etc.). If, at an iteration of block 466, the system determines the pause of the user in providing the spoken utterance satisfies the M threshold, then the system returns to block 462. Similar to the description above with respect to FIG. 3, at this subsequent iteration of block 462, the system can determine additional natural conversation output to be provided for audible presentation to the user, and the additional conversation output to be provided for audible presentation to the user selected at this subsequent iteration of block 462 may differ from the natural conversation output to be provided for audible presentation to the user selected at a prior iteration of block 462. Put another way, the system can determine the natural conversation output to be provided for audible presentation to the user selected at the prior iteration of block 462 to nudge the user to complete providing of the spoken utterance, whereas the system can determine the additional natural conversation output to be provided for audible presentation to the user selected at the subsequent iteration of block 462 to explicitly request the user to complete providing of the spoken utterance. If, at an iteration of block 466, the system determines that the pause of the user in providing the spoken utterance fails to satisfy the M threshold, then it proceeds to block 468.

At block 468, the system determines whether to fulfill the spoken utterance subsequent to causing the natural conversation output to be provided for audible presentation to the user. In some implementations, the system can determine to fulfill the spoken utterance in response to determining that the user completed providing of the spoken utterance subsequent to causing the natural conversation output (and/or any additional natural conversation output) to be provided for audible presentation to the user. In these implementations, the stream of ASR output, the stream of NLU output, and the stream of fulfillment data can be updated based on the user completing providing of the spoken utterance. In additional or alternative implementations, the system can determine to fulfill the spoken utterance in response to determining that the spoken utterance can be fulfilled based on the portion of the spoken utterance even if the user did not complete providing of the spoken utterance based one or more costs associated with causing the automated assistant to initiate fulfillment of the spoken utterance (e.g., as described in more detail with respect to FIG. 5C).

If, at an iteration of block 468, the system determines to fulfill the spoken utterance subsequent to causing the natural conversation output to be provided for audible presentation to the user, then the system proceeds to block 458 to cause the automated assistant to initiate fulfillment of the spoken utterance as described above. If, at an iteration of block 468, the system determines not to fulfill the spoken utterance subsequent to causing the natural conversation output (and/or any additional natural conversation output) to be provided for audible presentation to the user, then the system returns to block 462. Subsequent iterations of block 462 are described above. The system can continue performing iterations of blocks 462-468 until the system determines to fulfill the spoken utterance at an iteration of block 468 and the system proceeds to block 458 to cause the automated assistant to initiate fulfillment of the spoken utterance as described above.

Turning now to FIGS. 5A-5E, various non-limiting examples of determining whether to cause natural conversation output to be provided for presentation to a user in response to determining that the user paused in providing of a spoken utterance and/or determining when to fulfill the spoken utterance are depicted. An automated assistant can be implemented at least in part at the client device 110 (e.g., the automated assistant 115 described with respect to FIG. 1). The automated assistant can utilize a natural conversation system (e.g., the natural conversation system 180 described with respect to FIG. 1) to determine natural conversation output and/or fulfillment output to be implemented in furtherance of a dialog session between the automated assistant and a user 101 of the client device 110. The client device 110 depicted in FIGS. 5A-5E may include various user interface components including, for example, microphone(s) to generate audio data based on spoken utterances and/or other audible input, speaker(s) to audibly render synthesized speech and/or other audible output, and a display 190 to receive touch input and/or to visually render transcriptions and/or other visual output. Although the client device 110 depicted in FIGS. 5A-5E is a standalone interactive speaker having the display 190, it should be understood that is for the sake of example and is not meant to be limiting.

For example, and referring specifically to FIG. 5A, assume that the user 101 of the client device 110 provides a spoken utterance 552A1 of "Assistant, call Arnollld's" and then pauses for N seconds as indicated by 552A2, where N is any positive integer number and/or fraction thereof (e.g., 2 seconds, 2.5 seconds, 3 seconds, etc.). In this example, the automated assistant can cause a stream of audio data capturing the spoken utterance 552A1 and the pause indicated by 552A2 to be processed, using a streaming ASR model, to generate a stream of ASR output. Further, the automated assistant can cause the stream of ASR output to be processed, using an NLU model, to generate a stream of NLU output. Moreover, the automated assistant can cause a stream of fulfillment data to be generated using software application(s) accessible at the client device 110, 1P agent(s) accessible at the client device 110, and/or 3P agent(s) accessible at the client device 110 based on the stream of NLU output. In this example, and based on processing the spoken utterance 552A1, assume the ASR output includes recognized text corresponding to the spoken utterance 552A1 captured in the stream of audio data (e.g., recognized text corresponding to "call Arnold's"), the stream of NLU data includes a predicted "call" or "phone call" intent having a slot value of "Arnold" for a callee entity parameter associated with the predicted "call" or "phone call" intent, and the stream of fulfillment data includes an assistant command that, when executed, causes the client device 110 to initiate a phone call with a contact entry associated a friend of the user 101 named "Arnold". Accordingly, based on processing the spoken utterance 552A1 and without processing any additional spoken utterance, the automated assistant may determine that the spoken utterance 552A1 can be satisfied by causing the assistant command to be executed. However, and even though the automated assistant may determine that the spoken utterance 552A1 can be fulfilled, the automated assistant may refrain from initiating fulfillment of the spoken utterance.

In some implementations, the automated assistant can cause the stream of audio data to be processed, using an audio-based ML model, to determine audio-based characteristics associated with the spoken utterance 552A1. Further, the automated assistant can cause the audio-based characteristics to be processed, using an audio-based classification ML model, to generate output that indicates whether the user paused in providing of the spoken utterance 552A1 or completed providing of the spoken utterance. In the example of FIG. 5A, assume the output generated using the audio-based classification ML model indicates that the user 101 paused in providing of the spoken utterance 552A1 (e.g., as indicated by the user providing elongated syllables in "ArnollIld's"). Accordingly, in this example, the automated assistant may refrain from initiating fulfillment of the spoken utterance 552A1 based on at least the audio-based characteristics of the spoken utterance 552A1.

In additional or alternative implementations, the automated assistant can determine one or more computational costs associated with fulfillment of the spoken utterance 552A1. The one or more computational costs can include, for example, a computational cost associated with performing fulfillment of the spoken utterance 552A1, a computational cost associated with undoing performed fulfillment of the spoken utterance 552A1, and/or other computational costs. In the example of FIG. 5A, the computational cost associated with performing fulfillment of the spoken utterance 552A1 can include at least initiating the phone call with the contact entry associated with "Arnold" and/or other costs. Further, the computational cost associated with undoing performed fulfillment of the spoken utterance 552A1 can include at least terminating the phone call with the contact entry associated with "Arnold", re-initiating the dialog session with the user 101, processing additional spoken utterances, and/or other costs. Accordingly, in this example, the automated assistant may refrain from initiating fulfillment of the spoken utterance 552A1 based on at least the computational costs associated with prematurely fulfilling the spoken utterance 552A1 being relatively high.

As a result, the automated assistant may determine to provide natural conversation output 554A, such as "Mmhmm" as shown in FIG. 5A, for audible presentation to the user 101 via speaker(s) of the client device 110 (and optionally in response to determining that the user 101 has paused for N seconds after providing the spoken utterance 552A1 as indicated by 552A2). The natural conversation output 554A can be provided for audible presentation to the user 101 to provide an indication that the automated assistant is still listening and waiting for the user 101 to complete providing of the spoken utterance 552A1. Notably, in various implementations, while the automated assistant provides the natural conversation output 554A for presentation to the user 101, automated assistant components that are utilized in processing the stream of audio data (e.g., the ASR engine 120A1 and/or 120A2, the NLU engine 130A1 and/or 130A2, the fulfillment engine 140A1 and/or 140A2, and/or other automated assistant components of FIG. 1, such as the acoustic engine 161 of FIG. 1) can remain active at the client device 110. Further, in various implementations, the natural conversation output 554A can be provided for audible presentation to the user 101 at a lower volume than other audible output to avoid distracting the user 101 from completing the spoken utterance 552A1 and to reflect more natural conversation between actual humans.

In the example of FIG. 5A, further assume that the user 101 completed the spoken utterance 552A1 by providing spoken utterance 556A of "Call Arnold's Trattoria", where "Arnold's Trattoria" is a fictitious Italian restaurant. Based on the user 101 completing the spoken utterance 552A1 by providing the spoken utterance 556A, the automated assistant can cause the stream of ASR output, the stream of NLU output, and the stream of fulfillment data to be updated. In particular, the automated assistant can determine that the updated stream of NLU data still includes the predicted "call" or "phone call" intent, but having a slot value of "Arnold's Trattoria", rather than "Arnold" as previously predicted, for the callee entity parameter associated with the predicted "call" or "phone call" intent. Accordingly, the automated assistant can, in response to the user 101 completing the spoken utterance 552A1 by providing the spoken utterance 556A, cause the client device 110 (or an additional client device in communication with the client device 110 (e.g., a mobile device associated with the user 101)) to initiate a phone call with "Arnold's Trattoria", and optionally cause synthesized speech 558A of "Okay, calling Arnold's Trattoria" to be provided for audible presentation to the user 101. In these and other manners, the automated assistant can refrain from incorrectly prematurely fulfilling a predicted intent of the user 101 determined based on the spoken utterance 552A1 (e.g., by calling the contact entry "Arnold"), and wait for the user 101 to complete his/her thoughts to correctly fulfill a predicted intent of the user 101 determined based on the user 101 completing the spoken utterance 552A1 via the spoken utterance 556A (e.g., by calling the fictitious restaurant "Arnold's Trattoria").

As another example, and referring specifically to FIG. 5B, again assume that the user 101 of the client device 110 provides a spoken utterance 552B1 of "Assistant, call Arnolllld's" and then pauses for N seconds as indicated by 552B2, where N is any positive integer number and/or fraction thereof (e.g., 2 seconds, 2.5 seconds, 3 seconds, etc.). Similar to FIG. 5A, even though the automated assistant may determine that the spoken utterance 552B1 can be fulfilled, the automated assistant may refrain from initiating fulfillment of the spoken utterance 552B1 based on the audio-based characteristics associated with the spoken utterance 552B1, and/or based on one or more computational costs associated with performing fulfillment of the spoken utterance 552B1 and/or undoing fulfillment of the spoken utterance 552B1. Further assume that the automated assistant determines to provide natural conversation output 554B1, such as "Mmhmm" as shown in FIG. 5B, and causes the natural conversation output 554B1 to be provided for audible presentation to the user 101 of the client device 110.

However, in the example of FIG. 5B and in contrast with the example of FIG. 5A, assume that user 101 of the client device 110 fails to complete the spoken utterance 552B1 within M seconds of providing the natural conversation output 554B1 for audible presentation to the user 101 as indicated by 554B2, where M is any positive integer number and/or fraction thereof (e.g., 2 seconds, 2.5 seconds, 3 seconds, etc.) that may be the same or differ from the N seconds as indicated by 552B2.

As a result, in the example of FIG. 5B, the automated assistant can determine additional natural conversation output 556B to be provided for audible presentation to the user 101 of the client device 110. Notably, rather than causing a speech back channel to be provided for audible presentation to the user 101 of the client device 110 as with the natural conversation output 554B1 that indicates the automated assistant is waiting for the user 101 to complete the spoken utterance 552B1, the additional natural conversation output 556B can more explicitly indicate that the automated assistant is waiting for the user 101 to complete the spoken utterance 552B1 and/or request that the user 101 provide particular input in furtherance of the dialog session (e.g., as described below with respect to FIG. 5C). Further assume in the example of FIG. 5B that, in response to the additional natural conversation 556B being provided for audible presentation to the user 101, the user 101 of the client device 110 provides a spoken utterance 558B of "Sorry, call Arnold's Trattoria" to complete providing of the spoken utterance 552B1. Accordingly, the automated assistant can, in response to the user 101 completing providing of the spoken utterance 552B1 by providing the spoken utterance 558B, cause the client device 110 (or an additional client device in communication with the client device 110 (e.g., a mobile device of the user 101)) to initiate a phone call with "Arnold's Trattoria", and optionally cause synthesized speech 560B of "Okay, calling Arnold's Trattoria" to be provided for audible presentation to the user 101. Similar to FIG. 5B, the automated assistant can refrain from incorrectly prematurely fulfilling a predicted intent of the user 101 determined based on the spoken utterance 552B1 (e.g., by calling the contact entry "Arnold"), and wait for the user 101 to complete his/her thoughts to correctly fulfill a predicted intent of the user 101 in completing providing of the spoken utterance 556I via the spoken utterance 558B (e.g., by calling the fictitious restaurant "Arnold's Trattoria") even when the user 101 may pause for a longer duration of time as in the example of FIG. 5B.

As yet another example, and referring specifically to FIG. 5C, assume that the user 101 of the client device 110 provides a spoken utterance 552C1 of "Assistant, make a reservation tonight at Arnold's Trattoria for six people" and then pauses for N seconds as indicated by 552C2, where N is any positive integer number and/or fraction thereof (e.g., 2 seconds, 2.5 seconds, 3 seconds, etc.). In this example, and based on processing the spoken utterance 552C1, assume the ASR output includes recognized text corresponding to the spoken utterance 552C1 captured in the stream of audio data (e.g., recognized text corresponding to "make a reservation tonight at Arnold's Trattoria for six people"), the stream of NLU data includes a predicted "reservation" or "restaurant reservation" intent having a slot value of "Arnold's Trattoria" for a restaurant entity parameter associated with the predicted "reservation" or "restaurant reservation" intent, a slot value of "[today's date]" for a reservation date parameter associated with the predicted "reservation" or "restaurant reservation" intent, and a slot value of "six" for a number of people parameter associated with the predicted "reservation" or "restaurant reservation" intent. Notably, in providing the spoken utterance 552C1, the user 101 of the client device 110 failed to provide a slot value for a time parameter associated with the "reservation" or "restaurant reservation" intent. As a result, based on the stream on NLU data, the automated assistant may determine that the user 101 has paused in providing of the spoken utterance 552C1.

Further assume that the stream of fulfillment data includes an assistant command that, when executed, causes the client device 110 to make a restaurant reservation using a restaurant reservation software application accessible at the client device 110 and/or a restaurant reservation agent accessible at the client device 110 (e.g., one of the 1P agent(s) 171 and/or 3P agent(s) of FIG. 1). In the example of FIG. 5C, and in contrast with the examples of FIGS. 5A and 5B, based on processing the spoken utterance 552C1 and without processing any additional spoken utterance, the automated assistant may determine that the spoken utterance 552C1 can be satisfied by causing the assistant command to be executed. In this example, the automated assistant may initiate fulfillment of the spoken utterance 552C1 based on NLU measures associated with the stream of NLU data indicating that the user 101 intends to make a restaurant reservation, but simply failed to provide a slot value for the time parameter associated with the "reservation" or "restaurant reservation" intent. Accordingly, the automated assistant can establish a connection with the restaurant reservation software application accessible at the client device 110 and/or a restaurant reservation agent accessible at the client device 110 (e.g., one of the 1P agent(s) 171 and/or 3P agent(s) of FIG. 1), and begin providing the slot values to begin making the reservation even though fulfillment of the spoken utterance 552C1 cannot be fully performed.

Notably, as the automated assistant initiates fulfillment of the spoken utterance 552C1, the automated assistant can still determine to provide natural conversation output 554C1, such as "Uh huhh" as shown in FIG. 5C, and cause the natural conversation output 554C1 to be provided for audible presentation to the user 101 of the client device 110 since the automated assistant determined that the user 101 paused in providing of the spoken utterance 552C1 based on at least the stream of NLU data. However, in the example of FIG. 5C and similar to FIG. 5B, assume that user 101 of the client device 110 fails to complete the spoken utterance 552C1 within M seconds of providing the natural conversation output 554C1 for audible presentation to the user 101 as indicated by 554C2, where M is any positive integer number and/or fraction thereof (e.g., 2 seconds, 2.5 seconds, 3 seconds, etc.) that may be the same or differ from the N seconds as indicated by 552C2.

As a result, in the example of FIG. 5C, the automated assistant can determine additional natural conversation output 556C to be provided for audible presentation to the user 101 of the client device 110. Notably, rather than causing a speech back channel to be provided for audible presentation to the user 101 of the client device 110 as with the natural conversation output 554C1 that indicates the automated assistant is waiting for the user 101 to complete the spoken utterance 552C1, the additional natural conversation output 556C can request that the user 101 provide particular input in furtherance of the dialog session, such as "For what time?" based on the user 101 failing to provide a slot value for the time parameter associated with the "reservation" or "restaurant reservation" intent. Further assume in the example of FIG. 5C that, in response to the additional natural conversation 556C being provided for audible presentation to the user, the user 101 of the client device 110 provides a spoken utterance 558C of "7:00 PM" to complete providing of the spoken utterance 552B1. Accordingly, the automated assistant can, in response to the user 101 completing the spoken utterance 552C1 by providing the spoken utterance 558C, complete fulfillment of the assistant command using the slot value that was previously unknown and make the restaurant reservation on behalf of the user 101. In these and other manners, the automated assistant can wait for the user 101 to complete his/her thoughts by providing the natural conversation output 554C1, and subsequently prompt the user 101 to complete his/her thoughts by providing the natural conversation output 556C in instances where the user 101 does not complete his/her thoughts in response to providing of the natural conversation output 554C1.

Figure 5D:
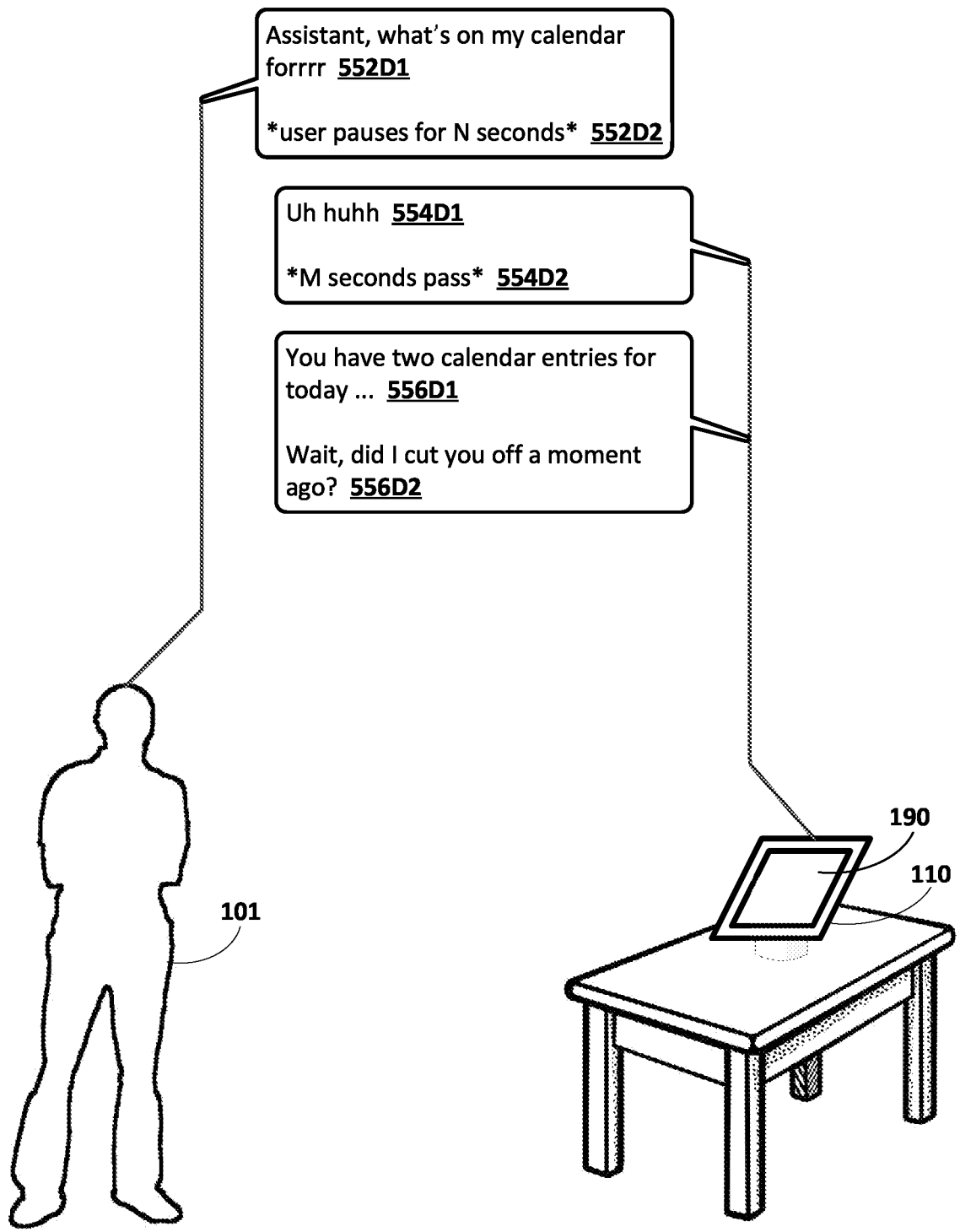

As yet another example, and referring specifically to FIG. 5D, assume that the user 101 of the client device 110 provides a spoken utterance 552D1 of "Assistant, what's on my calendar forrrr" and then pauses for N seconds as indicated by 552D2, where N is any positive integer number and/or fraction thereof (e.g., 2 seconds, 2.5 seconds, 3 seconds, etc.). In this example, and based on processing the spoken utterance 552C1, assume the ASR output includes recognized text corresponding to the spoken utterance 552D1 captured in the stream of audio data (e.g., recognized text corresponding to "what's on my calendar for"), the stream of NLU data includes a predicted "calendar" or "calendar lookup" intent having an unknown slot value for date parameter. In this example, the automated assistant may determine, based on the stream on NLU data, that the user 101 has paused in providing of the spoken utterance 552D1 since the user did not provide a slot value for the date parameter. Additionally, or alternatively, in this example, the automated assistant may determine, based on audio-based characteristics of the spoken utterance 552D1, that the user 101 has paused in providing of the spoken utterance 552D1 as indicated by the elongated syllables included in the spoken utterance 552D1 (e.g., the "rrrr" in providing "forrrr" in the spoken utterance 552D1).

Further assume that the stream of fulfillment data includes an assistant command that, when executed, causes the client device 110 to look up calendar information of the user 101 using a calendar software application accessible at the client device 110 and/or a calendar agent accessible at the client device 110 (e.g., one of the 1P agent(s) 171 and/or 3P agent(s) of FIG. 1). In the example of FIG. 5D, and in contrast with the examples of FIGS. 5A-5C, based on processing the spoken utterance 552D1 and without processing any additional spoken utterance, the automated assistant may determine that the spoken utterance 552D1 can be satisfied by causing the assistant command to be executed. In this example, the automated assistant may initiate fulfillment of the spoken utterance 552D1 based on NLU measures associated with the stream of NLU data indicating that the user 101 intends to look up one or more calendar entries, but simply failed to provide a slot value for the date parameter associated with the "calendar" or "calendar lookup" intent. Accordingly, the automated assistant can establish a connection with the calendar software application accessible at the client device 110 and/or a calendar agent accessible at the client device 110 (e.g., one of the 1P agent(s) 171 and/or 3P agent(s) of FIG. 1).

As the automated assistant initiates fulfillment of the spoken utterance 552D1, the automated assistant can still determine to provide natural conversation output 554D1, such as "Uh huhh" as shown in FIG. 5D, and cause the natural conversation output 554D1 to be provided for audible presentation to the user 101 of the client device 110 since the automated assistant determined that the user 101 paused in providing of the spoken utterance 552D1 based on the stream of NLU data. However, in the example of FIG. 5D and similar to FIGS. 5B and 5C, assume that user 101 of the client device 110 fails to complete the spoken utterance 552C1 within M seconds of providing the natural conversation output 554D1 for audible presentation to the user 101 as indicated by 554D2, where M is any positive integer number and/or fraction thereof (e.g., 2 seconds, 2.5 seconds, 3 seconds, etc.) that may be the same or differ from the N seconds as indicated by 552D2.

However, in the example of FIG. 5D, the automated assistant can determine to cause fulfillment of the spoken utterance 552D1 to be performed even though the user 101 may not have completed the spoken utterance 552D1. The automated assistant may make this determination based on one or more of computational costs associated with causing the fulfilment to be performed and/or undoing any performed fulfillment. In this example, the one or more of computational costs can include causing synthesized speech 556D1 of "You have two calendar entries for today . . . " to be provided for audible presentation to the user 101 in fulfillment of the spoken utterance 552D1, and causing other synthesized speech to be provided for audible presentation to the user 101 if the user 101 desired calendar information for another day. Accordingly, the automated assistant may determine to go ahead and cause fulfillment of the spoken utterance 552D1 to be performed with an inferred slot value of a current day for the date parameter associated with the "calendar" or "calendar lookup" intent since the computational costs of doing so are relatively low, and in an attempt to conclude the dialog session more quickly.

Notably, in various implementations, while the automated assistant provides the synthesized speech 556D1 for presentation to the user 101, automated assistant components that are utilized in processing the stream of audio data (e.g., the ASR engine 120A1 and/or 120A2, the NLU engine 130A1 and/or 130A2, the fulfillment engine 140A1 and/or 140A2, and/or other automated assistant components of FIG. 1, such as the acoustic engine 161 of FIG. 1) can remain active at the client device 110. Accordingly, in these implementations, if the user 101 interrupts the automated assistant during audible presentation of the synthesized speech 556D1 by providing another spoken utterance requesting a different date other than the inferred current date, the automated assistant can quickly and efficiently adapt fulfillment of the spoken utterance 552D1 based on the different date provided by the user 101. In additional or alternative implementations, and subsequent to causing the synthesized speech 556D1 to be provided for audible presentation to the user 101, the automated assistant can cause additional synthesized speech 556D2, such as "Wait, did I cut you off a second ago?", to be audibly rendered to proactively provide the user 101 with an opportunity to correct fulfillment of the spoken utterance 552D1. In these and other manners, the automated assistant can balance waiting for the user 101 to complete his/her thoughts by providing the natural conversation output 554D1 with concluding the dialog session in a more quick and efficient manner by fulfilling the spoken utterance 552D1 in instances where the computational costs of doing so are relatively low.

Figure 5E:
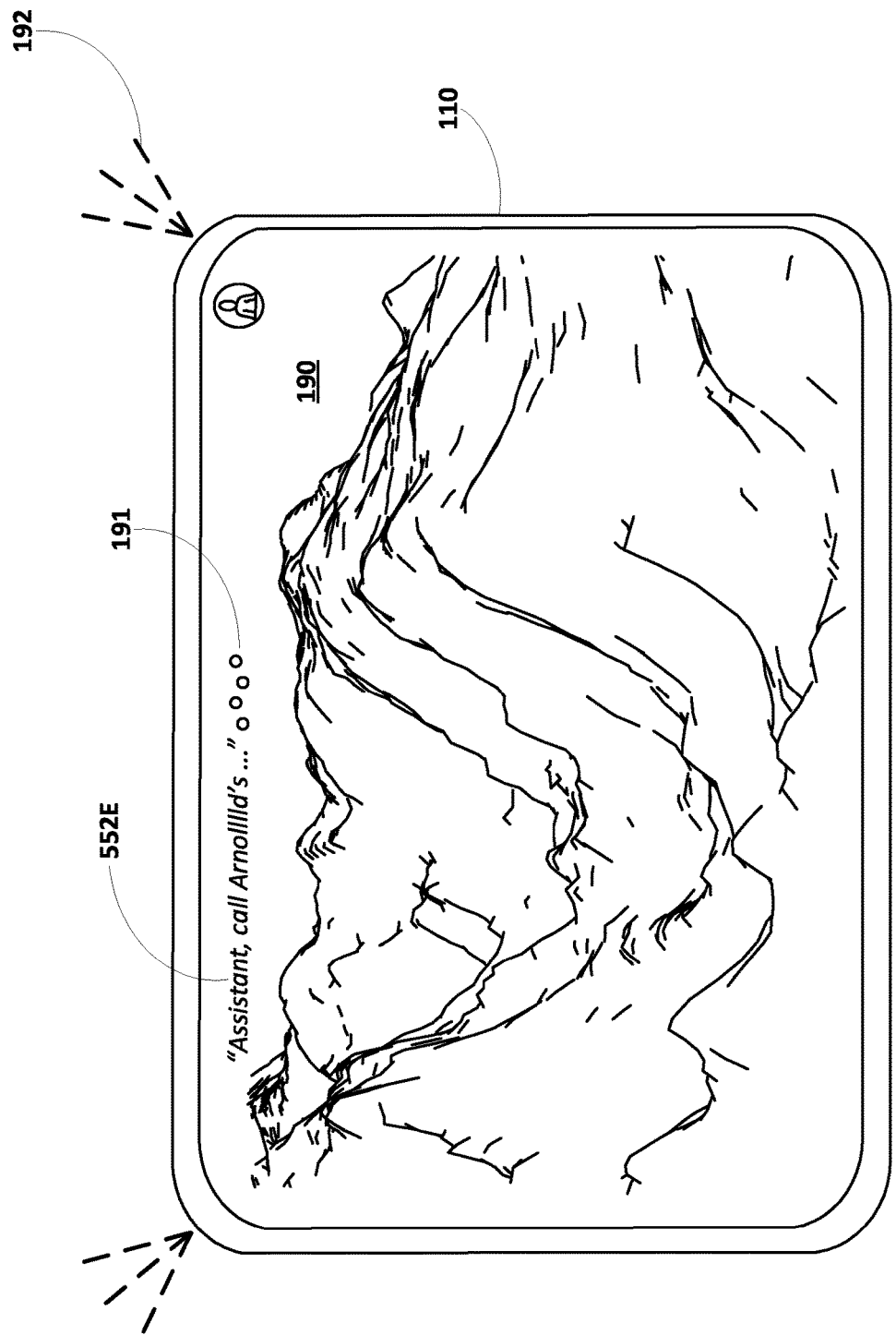

Although the examples of FIGS. 5A-5D are described with respect to causing natural conversation output to be provided for audible presentation to the user 101, it should be understood that is for the sake of example and is not meant to be limiting. For example, and referring briefly to FIG. 5E, again assume that the user 101 of the client device 110 provides a spoken utterance of "Assistant, call Arnolllld's" and then pauses for N seconds, where N is any positive integer number and/or fraction thereof (e.g., 2 seconds, 2.5 seconds, 3 seconds, etc.). In the example of FIG. 5E, a streaming transcription 552E of the spoken utterance can be provided for visual display to the user via the display 190 of the client device 190. In some implementations, the display 190 of the client device 110 can additionally or alternatively provide one or more graphical elements 191 that indicate the automated assistant is waiting for the user 101 to complete the spoken utterance, such as ellipses that are appended to the streaming transcription 552E that may move on the display 190. Although the graphical elements 191 depicted in FIG. 5E are ellipses appended to the streaming transcription, it should be understood that is for the sake of example and is not meant to be limiting, and that any other graphical elements can be provided for visual presentation to the user 101 to indicate that the automated assistant is waiting for the user 101 to complete providing of the spoken utterance. In additional or alternative implementations, one or more LEDs can be illuminated to indicate that the automated assistant is waiting for the user 101 to complete providing of the spoken utterance (e.g., as indicated by dashed lines 192), which may be particularly advantageous in instances where the client device 110 lacks the display 190. Moreover, it should be understood that the examples of FIGS. 5A-5E are provided merely for the sake of example and are not meant to be limiting.

Moreover, in implementations where the client device 110 of the user 101 includes the display 190, one or more selectable graphical elements associated with various interpretations of spoken utterance(s) can be provided for visual presentation to the user as the user provides the spoken utterance(s). The automated assistant can initiate fulfillment of the spoken utterance(s) based on receiving a user selection from the user 101 of a given one of the one or more selectable graphical elements and/or based on NLU measures associated with the given one of the one or more selectable graphical elements in response to no user selection from the user 101 being received within a threshold duration of time. For instance, in the example of FIG. 5A, a first selectable graphical element can be provided for presentation to the user 101 via the display after receiving the spoken utterance 552A1 of "Assistant, call Arnolllld's" that, when selected, causes the automated assistant to call a contact entry associated with "Arnold". However, as the user continues providing the spoken utterance 556A of "Call Arnold's Trattoria", the one or more selectable graphical elements can be updated to include a second selectable graphical element that, when selected, causes the automated assistant to call a restaurant associated with "Arnold's Trattoria". In this example, and assuming that the user 101 does not provide any user selection of the first selectable graphical element or the second selectable graphical element within a threshold duration of time (with respect the first selectable graphical element being presented or the second selectable graphical element being presented), the automated assistant can initiate the phone call with the restaurant "Arnold's Trattoria" based on NLU measures associated with initiating the phone call with the restaurant "Arnold's Trattoria" being more indicative of a true intent of the user 101 compared to NLU measures associated with initiating the phone call with the contact entry "Arnold".

Figure 6:
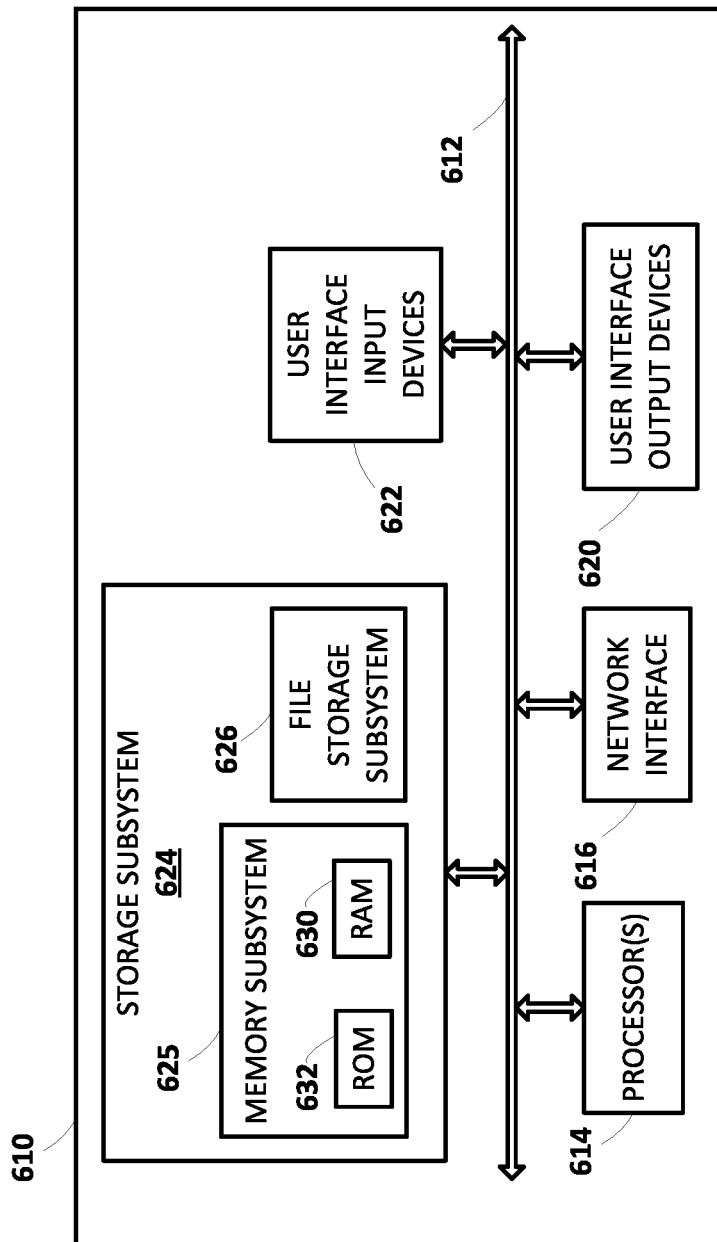
FIG. 6 depicts an example architecture of a computing device, in accordance with various implementations.

Turning now to FIG. 6, a block diagram of an example computing device 610 that may optionally be utilized to perform one or more aspects of techniques described herein is depicted. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes processing, using an automatic speech recognition (ASR) model, a stream of audio data to generate a stream of ASR output, the stream of audio data being generated by one or more microphones of a client device of a user, and the stream of audio data capturing a portion of a spoken utterance provided by the user that is directed to an automated assistant implemented at least in part at the client device; processing, using a natural language understanding (NLU) model, the stream of ASR output, to generate a stream of NLU output; determining, based on processing the stream of audio data, audio-based characteristics associated with the portion of the spoken utterance; determining, based on the audio-based characteristics associated with the portion of the spoken utterance, whether the user has paused in providing the spoken utterance or has completed providing the spoken utterance; and in response to determining that the user has paused in providing the spoken utterance, and in response to determining that the automated assistant can initiate fulfillment of the spoken utterance based on at least the stream of NLU output: determining natural conversation output to be provided for audible presentation to the user, the natural conversation output to be provided for audible presentation to the user to indicate the automated assistant is waiting for the user to complete providing of the spoken utterance; and causing the natural conversation output to be provided for audible presentation to the user via one or more speakers of the client device.

These and other implementations of technology disclosed herein can optionally include one or more of the following features.

In some implementations, causing the natural conversation output to be provided audible presentation to the user via the one or more speakers of the client device may be further in response to determining that the user has paused in providing the spoken utterance for a threshold duration of time.

In some implementations, determining whether the user has paused in providing the spoken utterance or has completed providing the spoken utterance based on the audio-based characteristics associated with the portion of the spoken utterance may include processing, using an audio-based classification machine learning (ML) model, the audio-based characteristics associated with the portion of the spoken utterance to generate output; and determining, based on the output generated using the audio-based classification ML model, whether the user has paused in providing the spoken utterance or has completed providing the spoken utterance.

In some implementations, the method may further include causing, based on the stream of NLU output, a stream of fulfillment data to be generated. Determining that the automated assistant can initiate fulfillment of the spoken utterance may be further based on the stream of fulfillment data. In some versions of those implementations, the method may further include in response to determining that the user has completed providing the spoken utterance: causing the automated assistant to initiate fulfillment of the spoken utterance based on the stream of fulfillment data. In additional or alternative versions of those implementations, the method may further include keeping one or more automated assistant components that utilize the ASR model active while causing the natural conversation output to be provided for audible presentation to the user via one or more speakers of the client device. In additional or alternative versions of those implementations, the method may further include determining, based on the stream of ASR output, whether the spoken utterance includes a particular word or phrase; and in response to determining that the spoken utterance includes the particular word or phrase: refraining from determining, based on the audio-based characteristics associated with the portion of the spoken utterance, whether the user has paused in providing the spoken utterance or has completed providing the spoken utterance; and causing the automated assistant to initiate fulfillment of the spoken utterance based on the stream of fulfillment data. In additional or alternative versions of those implementations, the method may further include determining whether the user has continued providing the spoken utterance within a threshold duration of time subsequent to causing the natural conversation output to be provided for audible presentation to the user via the one or more speakers of the client device; and in response to determining that the user has not continued providing the one or more spoken utterances within the threshold duration of time: determining, based on the stream of NLU data and/or the stream of fulfillment data, whether the automated assistant can initiate fulfillment of the spoken utterance; and in response to determining that the automated assistant can initiate fulfillment of the spoken utterance based on the stream of fulfillment data: causing the automated assistant to initiate fulfillment of the spoken utterance based on the stream of fulfillment data.

In some implementations, the method may further include determining whether the user has continued providing the spoken utterance within a threshold duration of time subsequent to causing the natural conversation output to be provided for audible presentation to the user via the one or more speakers of the client device; and in response to determining that the user has not continued providing the spoken utterance: determining additional natural conversation output to be provided for audible presentation to the user, the additional natural conversation output to be provided for audible presentation to the user to request that the user complete providing of the spoken utterance; and causing the additional natural conversation output to be provided for audible presentation to the user via one or more speakers of the client device.

In some implementations, the method may further include causing one or more graphical elements to be provided for visual presentation to the user via a display of the client device while causing the natural conversation output to be provided for audible presentation to the user via one or more speakers of the client device, the one or more graphical elements to be provided for visual presentation to the user to indicate the automated assistant is waiting for the user to complete providing of the spoken utterance. In some versions of those implementations, the ASR output may include a streaming transcription corresponding to the portion of the spoken utterance captured in the stream of audio data, and the method may further include causing the streaming transcription to be provided for visual presentation to the user via the display of the client device while causing the natural conversation output to be provided for audible presentation to the user via one or more speakers of the client device, wherein the one or more graphical elements are pre-pended or appended to the streaming transcription that is provided for visual presentation to the user via the display of the client device.

In some implementations, the method may further include causing one or more light emitting diodes (LEDs) of the client device to be illuminated while causing the natural conversation output to be provided for audible presentation to the user via one or more speakers of the client device, the one or more LEDs being illuminated to indicate the automated assistant is waiting for the user to complete providing of the spoken utterance.

In some implementations, the audio-based characteristics associated with the portion of the spoken utterance may include one or more of: intonation, tone, stress, rhythm, tempo, pitch, pause, one or more grammars associated with pause, and elongated syllables.

In some implementations, determining the natural conversation output to be provided for audible presentation to the user may include maintaining, in on-device memory of the client device, a set of natural conversation outputs; and selecting the natural conversation output, from among the set of natural conversation outputs, based on the audio-based characteristics associated with the portion of the spoken utterance.

In some implementations, causing the natural conversation output to be provided for audible presentation to the user via one or more speakers of the client device may include causing the natural conversation output to be provided for audible presentation to the user via the one or more speakers of the client device at a lower volume than other output provided for audible presentation to the user.

In some implementations, causing the natural conversation output to be provided for audible presentation to the user via the one or more speakers of the client device may include processing, using a text-to-speech (TTS) model, the natural conversation output to generate synthesized speech audio data that includes the natural conversation output; and causing the synthesized speech audio data to be provided for audible presentation to the user via the one or more speakers of the client device.

In some implementations, causing the natural conversation output to be provided for audible presentation to the user via the one or more speakers of the client device may include obtaining, from on-device memory of the client device, synthesized speech audio data that includes the natural conversation output; and causing the synthesized speech audio data to be provided for audible presentation to the user via the one or more speakers of the client device.

In some implementations, the one or more processors may be implemented locally at the client device of the user.

In some implementations a method implemented by one or more processors is provided, and includes processing, using an automatic speech recognition (ASR) model, a stream of audio data to generate a stream of ASR output, the stream of audio data being generated by one or more microphones of the client device, and the stream of audio data capturing a portion of a spoken utterance of the user that is directed to an automated assistant implemented at least in part at the client device; processing, using a natural language understanding (NLU) model, the stream of ASR output, to generate a stream of NLU output; determining, based on at least the stream of NLU output, whether the user has paused in providing the spoken utterance or has completed providing the spoken utterance; and in response to determining that the user has paused in providing the spoken utterance and has not completed providing of the spoken utterance: determining natural conversation output to be provided for audible presentation to the user, the natural conversation output to be provided for audible presentation to the user to indicate the automated assistant is waiting for the user to complete providing of the spoken utterance; and causing the natural conversation output to be provided for audible presentation to the user via one or more speakers of the client device.

These and other implementations of technology disclosed herein can optionally include one or more of the following features.

In some implementations, determining whether the user has paused in providing the spoken utterance or has completed providing the spoken utterance based on the stream of NLU output may include determining, based on the stream of NLU output, whether the automated assistant can initiate fulfillment of the spoken utterance. Determining that the user has paused in providing the spoken utterance may include determining that the automated assistant cannot initiate fulfillment of the spoken utterance based on the stream of NLU output. In some versions of those implementations, the method may further include determining whether the user has continued providing the spoken utterance within a threshold duration of time subsequent to causing the natural conversation output to be provided for audible presentation to the user via the one or more speakers of the client device; and in response to determining that the user has not continued providing the spoken utterance: determining additional natural conversation output to be provided for audible presentation to the user, the additional natural conversation output to be provided for audible presentation to the user to request that the user complete providing of the spoken utterance; and causing the additional natural conversation output to be provided for audible presentation to the user via one or more speakers of the client device. In some further versions of those implementations, the additional natural conversation output to be provided for audible presentation to the user may request that an additional portion of the spoken utterance includes particular data based on the stream of NLU data.

In some implementations a method implemented by one or more processors is provided, and includes processing, using an automatic speech recognition (ASR) model, a stream of audio data to generate a stream of ASR output, the stream of audio data being generated by one or more microphones of the client device, and the stream of audio data capturing a portion of a spoken utterance of the user that is directed to an automated assistant implemented at least in part at the client device; processing, using a natural language understanding (NLU) model, the stream of ASR output, to generate a stream of NLU output; determining whether the user has paused in providing the spoken utterance or has completed providing the spoken utterance; and in response to determining that the user has paused in providing the spoken utterance and has not completed providing of the spoken utterance: determining natural conversation output to be provided for audible presentation to the user, the natural conversation output to be provided for audible presentation to the user to indicate the automated assistant is waiting for the user to complete providing of the spoken utterance; causing the natural conversation output to be provided for audible presentation to the user via one or more speakers of the client device; and in response to determining the user has not completed providing of the spoken utterance within a threshold duration of time subsequent to causing the natural conversation output to be provided for audible presentation to the user via the one or more speakers of the client device: determining, based on at least the stream of NLU data, whether the automated assistant can initiate fulfillment of the spoken utterance; and in response to determining that the automated assistant can initiate fulfillment of the spoken utterance based on the stream of NLU data: causing the automated assistant to initiate fulfillment of the spoken utterance.

These and other implementations of technology disclosed herein can optionally include one or more of the following features.

In some implementations, the method may further include determining, based on processing the stream of audio data, audio-based characteristics associated with the portion of the spoken utterance. Determining whether the user has paused in providing the spoken utterance or has completed providing the utterance may be based on the audio-based characteristics associated with the portion of the spoken utterance.

In some implementations, determining whether the user has paused in providing the spoken utterance or has completed providing the spoken utterance may be based on the stream of NLU data.

In some implementations, the method may further include in response to determining that the automated assistant cannot initiate fulfillment of the spoken utterance based on the stream of NLU data: determining natural conversation output to be provided for audible presentation to the user, the natural conversation output to be provided for audible presentation to the user to request that the user complete providing of the spoken utterance; and causing the additional natural conversation output to be provided for audible presentation to the user via one or more speakers of the client device. In some versions of those implementations, the natural conversation output to be provided for audible presentation to the user may request that an additional portion of the spoken utterance includes particular data based on the stream of NLU data.

In some implementations, determining whether the automated assistant can initiate fulfillment of the spoken utterance may be further based on one or more computational costs associated with fulfillment of the spoken utterance. In some versions of those implementations, the one or more computational costs associated with fulfillment of the spoken utterance may include one or more of: a computational cost associated with performing fulfillment of the spoken utterance, and a computational cost associated with undoing performed fulfillment of the spoken utterance.

In some implementations, the method may further include causing, based on the stream of NLU output, a stream of fulfillment data to be generated. Determining that the automated assistant can initiate fulfillment of the spoken utterance may be further based on the stream of fulfillment data.

In some implementations a method implemented by one or more processors is provided, and includes receiving a stream of audio data, the stream of audio data being generated by one or more microphones of a client device of a user, and the stream of audio data capturing at least a portion of a spoken utterance provided by the user that are directed to an automated assistant implemented at least in part at the client device; determining, based on processing the stream of audio data, audio-based characteristics associated with the portion of the spoken utterance; determining, based on the audio-based characteristics associated with the portion of the spoken utterance, whether the user has paused in providing the spoken utterance or has completed providing the spoken utterance; and in response to determining that the user has paused in providing the spoken utterance and has not completed providing of the spoken utterance: determining natural conversation output to be provided for audible presentation to the user, the natural conversation output to be provided for audible presentation to the user to indicate the automated assistant is waiting for the user to complete providing of the spoken utterance; and causing the natural conversation output to be provided for audible presentation to the user via one or more speakers of the client device.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:
    processing, using an automatic speech recognition (ASR) model, a stream of audio data to generate a stream of ASR output, the stream of audio data being generated by one or more microphones of a client device of a user, and the stream of audio data capturing a portion of a spoken utterance provided by the user that is directed to an automated assistant implemented at least in part at the client device;
    processing, using a natural language understanding (NLU) model, the stream of ASR output, to generate a stream of NLU output;
    determining, based on the stream of NLU output, that the automated assistant can initiate fulfillment of the spoken utterance;
    determining, based on processing the stream of audio data, audio-based characteristics associated with the portion of the spoken utterance;
    determining, based on the audio-based characteristics associated with the portion of the spoken utterance, whether the user has paused in providing the spoken utterance or has completed providing the spoken utterance; and
    in response to determining that the user has paused in providing the spoken utterance, and in response to determining that the automated assistant can initiate fulfillment of the spoken utterance based on at least the stream of NLU output:
        determining whether to initiate fulfillment of the spoken utterance; and
        in response to determining to refrain from initiating fulfillment of the spoken utterance:
            determining natural conversation output to be provided for audible presentation to the user, the natural conversation output to be provided for audible presentation to the user to indicate the automated assistant is waiting for the user to complete providing of the spoken utterance; and
            causing the natural conversation output to be provided for audible presentation to the user via one or more speakers of the client device.

2. The method of claim 1, wherein causing the natural conversation output to be provided audible presentation to the user via the one or more speakers of the client device is further in response to determining that the user has paused in providing the spoken utterance for a threshold duration of time.

3. The method of claim 1, wherein determining whether the user has paused in providing the spoken utterance or has completed providing the spoken utterance based on the audio-based characteristics associated with the portion of the spoken utterance comprises:
    processing, using an audio-based classification machine learning (ML) model, the audio-based characteristics associated with the portion of the spoken utterance to generate output; and
    determining, based on the output generated using the audio-based classification ML model, whether the user has paused in providing the spoken utterance or has completed providing the spoken utterance.

4. The method of claim 1, further comprising:
    causing, based on the stream of NLU output, a stream of fulfillment data to be generated,
        wherein the stream of fulfillment data includes an indication of fulfillment of the spoken utterance, and
        wherein determining whether the automated assistant can initiate fulfillment of the spoken utterance is further based on the stream of fulfillment data.

5. The method of claim 4, further comprising:
    in response to determining that the user has completed providing the spoken utterance:
        causing the automated assistant to initiate fulfillment of the spoken utterance based on the stream of fulfillment data.

6. The method of claim 4, further comprising:
    keeping one or more automated assistant components that utilize the ASR model active while causing the natural conversation output to be provided for audible presentation to the user via one or more speakers of the client device.

7. The method of claim 4, further comprising:
    determining, based on the stream of ASR output, whether the spoken utterance includes a particular word or phrase; and
    in response to determining that the spoken utterance includes the particular word or phrase:
        refraining from determining, based on the audio-based characteristics associated with the portion of the spoken utterance, whether the user has paused in providing the spoken utterance or has completed providing the spoken utterance; and causing the automated assistant to initiate fulfillment of the spoken utterance based on the stream of fulfillment data.

8. The method of claim 4, further comprising:
determining whether the user has continued providing the spoken utterance within a threshold duration of time subsequent to causing the natural conversation output to be provided for audible presentation to the user via the one or more speakers of the client device; and
in response to determining that the user has not continued providing the one or more spoken utterances within the threshold duration of time:
determining, based on the stream of NLU data and/or the stream of fulfillment data, whether the automated assistant can initiate fulfillment of the spoken utterance; and
in response to determining that the automated assistant can initiate fulfillment of the spoken utterance based on the stream of fulfillment data:
causing the automated assistant to initiate fulfillment of the spoken utterance based on the stream of fulfillment data.

9. The method of claim 1, further comprising:
determining whether the user has continued providing the spoken utterance within a threshold duration of time subsequent to causing the natural conversation output to be provided for audible presentation to the user via the one or more speakers of the client device; and
in response to determining that the user has not continued providing the spoken utterance:
determining additional natural conversation output to be provided for audible presentation to the user, the additional natural conversation output to be provided for audible presentation to the user to request that the user complete providing of the spoken utterance; and
causing the additional natural conversation output to be provided for audible presentation to the user via one or more speakers of the client device.

10. The method of claim 1, further comprising:
causing one or more graphical elements to be provided for visual presentation to the user via a display of the client device while causing the natural conversation output to be provided for audible presentation to the user via one or more speakers of the client device, the one or more graphical elements to be provided for visual presentation to the user to indicate the automated assistant is waiting for the user to complete providing of the spoken utterance.

11. The method of claim 10, wherein the ASR output includes a streaming transcription corresponding to the portion of the spoken utterance captured in the stream of audio data, and further comprising:
causing the streaming transcription to be provided for visual presentation to the user via the display of the client device while causing the natural conversation output to be provided for audible presentation to the user via one or more speakers of the client device, wherein the one or more graphical elements are prepended or appended to the streaming transcription that is provided for visual presentation to the user via the display of the client device.

12. The method of claim 1, further comprising:
causing one or more light emitting diodes (LEDs) of the client device to be illuminated while causing the natural conversation output to be provided for audible presentation to the user via one or more speakers of the client device, the one or more LEDs being illuminated to indicate the automated assistant is waiting for the user to complete providing of the spoken utterance.

13. The method of claim 1, wherein the audio-based characteristics associated with the portion of the spoken utterance include one or more of: intonation, tone, stress, rhythm, tempo, pitch, pause, one or more grammars associated with pause, and elongated syllables.

14. The method of claim 1, wherein determining the natural conversation output to be provided for audible presentation to the user comprises:
maintaining, in on-device memory of the client device, a set of natural conversation outputs; and
selecting the natural conversation output, from among the set of natural conversation outputs, based on the audio-based characteristics associated with the portion of the spoken utterance.

15. The method of claim 1, wherein causing the natural conversation output to be provided for audible presentation to the user via one or more speakers of the client device comprises:
causing the natural conversation output to be provided for audible presentation to the user via the one or more speakers of the client device at a lower volume than other output provided for audible presentation to the user.

16. A method implemented by one or more processors, the method comprising:
processing, using an automatic speech recognition (ASR) model, a stream of audio data to generate a stream of ASR output, the stream of audio data being generated by one or more microphones of the client device, and the stream of audio data capturing a portion of a spoken utterance of a user that is directed to an automated assistant implemented at least in part at the client device;
processing, using a natural language understanding (NLU) model, the stream of ASR output, to generate a stream of NLU output;
determining, based on at least the stream of NLU output, whether the user has paused in providing the spoken utterance or has completed providing the spoken utterance;
in response to determining that the user has paused in providing the spoken utterance and has not completed providing of the spoken utterance:
determining natural conversation output to be provided for audible presentation to the user, the natural conversation output to be provided for audible presentation to the user to indicate the automated assistant is waiting for the user to complete providing of the spoken utterance; and
causing the natural conversation output to be provided for audible presentation to the user via one or more speakers of the client device; and
subsequent to causing the natural conversation output to be provided for audible presentation to the user via the one or more speakers of the client device:
determining whether the user has continued providing the spoken utterance within a threshold duration of time; and
in response to determining that the user has not continued providing the spoken utterance:
determining additional natural conversation output to be provided for audible presentation to the user, the additional natural conversation output to be provided for audible presentation to the user to request that an additional portion of the spoken utterance includes particular data based on the stream of NLU data; and causing the additional natural conversation output to be provided for audible presentation to the user via one or more speakers of the client device.

17. The method of claim 16, wherein determining whether the user has paused in providing the spoken utterance or has completed providing the spoken utterance based on the stream of NLU output comprises:

determining, based on the stream of NLU output, whether the automated assistant can initiate fulfillment of the spoken utterance, wherein determining that the user has paused in providing the spoken utterance comprises determining that the automated assistant cannot initiate fulfillment of the spoken utterance based on the stream of NLU output.

18. A method implemented by one or more processors, the method comprising:

processing, using an automatic speech recognition (ASR) model, a stream of audio data to generate a stream of ASR output, the stream of audio data being generated by one or more microphones of the client device, and the stream of audio data capturing a portion of a spoken utterance of a user that is directed to an automated assistant implemented at least in part at the client device;

processing, using a natural language understanding (NLU) model, the stream of ASR output, to generate a stream of NLU output;

determining whether the user has paused in providing the spoken utterance or has completed providing the spoken utterance; and in response to determining that the user has paused in providing the spoken utterance and has not completed providing of the spoken utterance:

determining natural conversation output to be provided for audible presentation to the user, the natural conversation output to be provided for audible presentation to the user to indicate the automated assistant is waiting for the user to complete providing of the spoken utterance;

causing the natural conversation output to be provided for audible presentation to the user via one or more speakers of the client device; and in response to determining the user has not completed providing of the spoken utterance within a threshold duration of time subsequent to causing the natural conversation output to be provided for audible presentation to the user via the one or more speakers of the client device:

determining, based on at least the stream of NLU data, whether the automated assistant can initiate fulfillment of the spoken utterance; and in response to determining that the automated assistant can initiate fulfillment of the spoken utterance based on the stream of NLU data and prior to receiving an additional portion of the spoken utterance that includes particular data based on the stream of NLU data:

causing the automated assistant to initiate fulfillment of the spoken utterance.

* * * * *